United States Patent
Engler et al.

(12) 
(10) Patent No.: US 6,633,851 B1
(45) Date of Patent: Oct. 14, 2003

(54) SYSTEMS AND METHODS FOR GENERATING CUSTOM REPORTS BASED ON POINT-OF-SALE DATA

(75) Inventors: Jeffery T. Engler, Rancho Mirage, CA (US); Lee J. Engler, Minnetonka, MN (US); Leonard M. Newman, Plymouth, MN (US)

(73) Assignee: B-50.com, LLC, Minneapolis, MN (US)

( * ) Notice: Subject to any disclaimer, the term of this patent is extended or adjusted under 35 U.S.C. 154(b) by 355 days.

(21) Appl. No.: 09/676,652

(22) Filed: Sep. 29, 2000

Related U.S. Application Data
(60) Provisional application No. 60/157,467, filed on Oct. 1, 1999.

(51) Int. Cl.[7] ............................................. G06F 17/60

(52) U.S. Cl. ....................................................... 705/21

(58) Field of Search ............................... 705/21, 30, 15, 705/16, 18, 27; 707/3, 4, 5, 503, 504, 505, 506, 507, 508, 509

(56) References Cited

U.S. PATENT DOCUMENTS

| | | | |
|---|---|---|---|
| 5,119,294 A | * 6/1992 | Tanaka ......................... | 705/21 |
| 5,179,643 A | 1/1993 | Homma et al. | |
| 5,490,060 A | 2/1996 | Malac et al. | |
| 5,570,291 A | 10/1996 | Dudle et al. | |
| 5,712,985 A | 1/1998 | Lee et al. | |
| 5,765,143 A | 6/1998 | Sheldon et al. | |
| 5,819,274 A | * 10/1998 | Jackson, Jr. ................... | 707/10 |
| 5,832,458 A | * 11/1998 | Jones ............................ | 705/14 |
| 5,854,746 A | 12/1998 | Yamamoto et al. | |
| 5,893,076 A | 4/1999 | Hafner et al. | |
| 5,924,077 A | * 7/1999 | Beach et al. ................... | 705/10 |
| 5,930,764 A | 7/1999 | Melchione et al. | |
| 5,966,695 A | 10/1999 | Melchione et al. | |
| 5,974,395 A | 10/1999 | Bellini et al. | |
| 5,974,396 A | 10/1999 | Anderson et al. | |
| 5,991,735 A | 11/1999 | Gerace | |
| 5,999,908 A | 12/1999 | Abelow | |
| 6,026,366 A | 2/2000 | Grube | |
| 6,067,525 A | 5/2000 | Johnson et al. | |
| 6,070,147 A | 5/2000 | Harms et al. | |
| 6,078,891 A | 6/2000 | Riordan et al. | |

FOREIGN PATENT DOCUMENTS

JP   5-101279   * 4/1993

OTHER PUBLICATIONS

Spectrum Report Writer Online Brochure, from http://www.pacsys.com/booklet/index.htm., Dec. 2002.*
Spectrum Writer Overview of Features Booklet, Dec. 1999.*
B–50, Inc., *F.I.R.S.T. Installation Notes for SCC*, (1998).
B–50, Inc., "F.I.R.S.T. Program and Database Update to Version 3.2", (Mar. 27, 1998).

* cited by examiner

*Primary Examiner*—Robert P. Olszewski
*Assistant Examiner*—Andrew Fischer
(74) *Attorney, Agent, or Firm*—Schwegman, Lundberg, Woessner & Kluth, P.A.

(57) ABSTRACT

A method of generating custom reports based on point-of-sale data transferred between multiple remote computing devices and a central computing device includes generating point-of-sale data at multiple remote locations, transferring the point-of-sale data to a central computing device from multiple computing devices at the respective multiple remote locations, defining a custom report format, the custom report format specifying at least two of the multiple remote locations and specifying a date range, the date range and the at least two multiple remote locations being freely selectable by a user, generating a custom report using the custom report format, the custom report being based on point-of-sale data related to the specified remote locations and the specified date range, and communicating the custom report to a human being. A computer program embodied on a computer-readable medium for generating custom reports is also disclosed, as are subscription services, computer systems, graphical user interfaces and other features.

19 Claims, 29 Drawing Sheets

```
Sales
Temperature
Deposit
Cash +/-
Items per Transaction
Average Ticket
Counter Ticket
Percent Beverage
Transactions
Overring Dollars
Overring Percent
```

FIG. 17

```
Number of Overrings
Delete Dollars
Delete Percent
Number of Deletes
Drive Thru Time
Counter Time
Number of Cars
Drive Thru Dollars
Drive Thru Dollars Percent
Average per Car
ICOS Variance
```

FIG. 18

760 — Reporting Current Period End Date:
Start with the extract day's [Date ▽]
and go back [0 ▽] day(s), [0 ▽] week(s),
[0 ▽] period(s), and [0 ▽] year(s)

770 — Reporting Current Period End Date:
Start with the reporting current period begin date's
[Date ▽]
and go back [0 ▽] day(s), [0 ▽] week(s),
[0 ▽] period(s), and [0 ▽] year(s)

760 — Reporting Prior Period End Date:
Start with the extract day's [Date ▽]
and go back [0 ▽] day(s), [0 ▽] week(s),
[0 ▽] period(s), and [0 ▽] year(s)

770 — Reporting Prior Period End Date:
Start with the reporting prior period end date's
[Date ▽]
and go back [0 ▽] day(s), [0 ▽] week(s),
[0 ▽] period(s), and [0 ▽] year(s)

9/23/99 11:17 AM                                    YOUR COMPANY                                                              Page 2 of 9
                                                    Sales Mix Report
Sales Mix Detail by Category                                                                                                    ↓ Detail

| A Tacos | # Items Current | # Items Prior | Chg | Item Mix Current | Item Mix Prior | Chg | $ Mix Current | $ Mix Prior | Chg | Food | Paper | F/P |
|---|---|---|---|---|---|---|---|---|---|---|---|---|
| Double Decker | 594 | 897 | (33.8) | 0.9 | 1.1 | (22.4) | 0.9 | 1.1 | (17.0) | 22.0 | 0.00 | 22.0 |
| (Skipped Categories) | ... | ... | ... | ... | ... | ... | ... | ... | ... | ... | ... | ... |
| Soft | 6,224 | 8,291 | (24.9) | 9.0 | 10.2 | (12.0) | 6.8 | 7.6 | (9.9) | 23.4 | 0.0 | 23.4 |
| (Skipped Categories) | ... | ... | ... | ... | ... | ... | ... | ... | ... | ... | ... | ... |
| Taco Supreme | 2,099 | 3,074 | (25.6) | 31.0 | 35.6 | (12.8) | 24.7 | 27.3 | (9.2) | 24.8 | 0.0 | 24.8 |
| Total | 21,582 | 28,928 | (25.6) | 31.0 | 35.6 | (12.8) | 24.7 | 27.3 | (9.2) | 24.8 | 0.0 | 24.8 |

↑ Detail Total

|  |  |  |  |  |  |
|---|---|---|---|---|---|
| 9/7/99 1:32 PM | | YOUR COMPANY | | | Page 1 of 1 |
| | | Price Variation Report | | | |

H1 ← Stores: District 1

H2 ← Date Range: 8/31/1999 thru 9/6/1999 Calendar

| Overcharge: | $5.70 | → H3 |
|---|---|---|
| Undercharge: | ($108.31) | → H4 |
| Net: | ($102.61) | → H5 |

↑ Header

Detail ↓

| Business Date | Store | | Qty Sold | Price | Over(Under) |
|---|---|---|---|---|---|
| Menu Item: S-KIDS | Two Soft Tacos, Nachos & Toy | | | $2.00 | ($74.25) |
| 8/31/99 | 000001 | Uptown | 11 | $1.01 | ($10.89) |
| 9/1/99 | 000002 | Uptown | 12 | $1.01 | ($11.88) |
| 9/2/99 | 000003 | Uptown | 5 | $1.01 | ($4.95) |
| 9/3/99 | 000004 | Uptown | 7 | $1.01 | ($6.93) |
| 9/4/99 | 000005 | Uptown | 18 | $1.01 | ($17.82) |
| 9/5/99 | 000002 | Downtown | 9 | $1.01 | ($8.91) |
| 9/6/99 | 000003 | Suburbia | 13 | $1.01 | ($12.87) |

D1 ← Menu Item: T-KIDS  Two Tacos, Nachos & Toy    $2.00  ($33.66) ▲ D3

D2 ← 8/31/99    000001 Uptown    4   $1.01   ($3.96) → D4

| 9/1/99 | 000002 | Uptown | 7 | $1.01 | ($6.93) |
|---|---|---|---|---|---|
| 9/2/99 | 000003 | Uptown | 3 | $1.01 | ($2.97) |
| 9/3/99 | 000004 | Uptown | 4 | $1.01 | ($3.96) |
| 9/4/99 | 000005 | Uptown | 7 | $1.01 | ($6.93) |
| 9/5/99 | 000002 | Downtown | 1 | $1.01 | ($0.99) |
| 9/6/99 | 000003 | Suburbia | 8 | $1.01 | ($7.92) |

Menu Item: RTB-20   Root Beer - 20 oz.    $1.09   ($0.20) → D7

D5 ← 9/5/99    000002 Downtown    2   $0.99   ($0.20) → D9, D8

D6 ← Menu Item: TEA-20   Tea - 20 oz.    $1.09   ($0.20)

| 9/5/99 | 000002 | Downtown | 1 | $0.99 | ($0.10) |
|---|---|---|---|---|---|
| 9/5/99 | 000003 | Suburbia | 1 | $0.99 | ($0.10) |

| Menu Item: GCKSUP | Big Chicken Burrito Supreme | | | $2.29 | $5.70 |
|---|---|---|---|---|---|
| 8/31/99 | 00004 | Country | 13 | $2.39 | $1.30 |
| 9/1/99 | 00005 | Country | 13 | $2.39 | $1.30 |
| 9/2/99 | 00006 | Country | 4 | $2.39 | $0.40 |
| 9/3/99 | 00007 | Country | 8 | $2.39 | $0.80 |
| 9/4/99 | 00008 | Country | 4 | $2.39 | $0.40 |
| 9/5/99 | 00009 | Country | 8 | $2.39 | $0.80 |
| 9/6/99 | 00010 | Country | 7 | $2.39 | $0.70 |

| | 9/16/99 10:15 am | | Your Company Planned Sales for the Year 1999 | | | Page 1 of 1 | |
|---|---|---|---|---|---|---|---|
| H2 | Stores: District 6 | | | | | | H1 |
| Header | | | | | | | |
| Detail | | Period 1 | Period 2 | Periods 3-11 are skipped in this sample | Period 12 | Period 13 | Total | D2 |
| ↓ | 000001 | 48,072 | 54,081 | ... | 72,571 | 70,907 | 924,469 | D3 |
| D1 | 000002 | 74,459 | 83,472 | ... | 104,504 | 103,720 | 1,306,297 |
| | 000003 | 72,630 | 79,684 | ... | 104,373 | 103,459 | 1,306,295 |
| T1 | TOTAL | 195,161 | 217,237 | | 281,448 | 278086 | 3,537,061 | T2 |

FIG. 28

Menu Item Report
9/2/99

| Code | Description | Food Cost | Paper Cost | Total Cost | Price | Cost % | Margin % |
|---|---|---|---|---|---|---|---|
| 16-OZ | 16-OZ | $0.14 | $0.04 | $0.18 | $0.99 | 18.18% | 81.82% |
| 7UP-16 | 7Up - 16 | $0.12 | $0.04 | $0.16 | $0.99 | 16.16% | 83.84% |
| chb-16 | Cherry Icee 16oz | $0.00 | $0.00 | $0.00 | $0.89 | 0.00% | 100.00% |
| DEW-16 | Mountain Dew - 16 | $0.13 | $0.04 | $0.17 | $0.99 | 17.17% | 82.83% |
| DIT-16 | Diet Pepsi - 16 | $0.14 | $0.04 | $0.18 | $0.99 | 18.18% | 81.82% |
| DRP-16 | Dr. Pepper - 16 | $0.13 | $0.04 | $0.17 | $0.99 | 17.17% | 82.83% |
| LEM-16 | Lemonade | $0.14 | $0.04 | $0.18 | $0.99 | 18.18% | 81.82% |
| OSL-16 | Orange Slice | $0.13 | $0.00 | $0.13 | $0.99 | 13.13% | 86.87% |
| PCH-16 | Punch - 16 | $0.20 | $0.04 | $0.24 | $0.99 | 24.24% | 75.76% |
| PEP-16 | Pepsi - 16 | $0.14 | $0.04 | $0.18 | $0.99 | 18.18% | 81.82% |
| RTB-16 | Root Beer - 16 | $0.14 | $0.04 | $0.18 | $0.99 | 18.18% | 81.82% |
| SLC-16 | Slice | $0.14 | $0.04 | $0.18 | $0.99 | 18.18% | 81.82% |
| STEA16 | Sweetened Tea | $0.00 | $0.00 | $0.00 | $0.99 | 0.00% | 100.00% |
| TEA-16 | Tea - 16 | $0.14 | $0.04 | $0.18 | $0.99 | 18.18% | 81.82% |
| 32-OZ | 32-OZ | $0.28 | $0.13 | $0.41 | $1.29 | 31.78% | 68.22% |
| 7UP-32 | 7Up - 32 | $0.25 | $0.13 | $0.38 | $1.29 | 29.46% | 70.54% |
| CHBR32 | Cherry Icee 32oz | $0.00 | $0.00 | $0.00 | $1.29 | 0.00% | 100.00% |
| DEW-32 | Mountain Dew - 32 | $0.28 | $0.13 | $0.41 | $1.29 | 31.78% | 68.22% |
| DIT-32 | Diet Pepsi – 32 | $0.28 | $0.13 | $0.41 | $1.29 | 31.78% | 68.22% |

FIG. 30

SYSTEMS AND METHODS FOR GENERATING CUSTOM REPORTS BASED ON POINT-OF-SALE DATA

CROSS-REFERENCE TO RELATED APPLICATION

The subject matter of this application is related to the subject matter of U.S. patent application No. 60/157,467, filed Oct. 1, 1999, which is incorporated by reference herein and priority to which is claimed under 35 U.S.C. §119(e).

BACKGROUND OF THE INVENTION

1. Field of the Invention

The invention relates to the electronic collection and collation of information from various data sources. More particularly, embodiments of the invention create custom-formatted reports, based on point-of-sale data from franchise restaurants, for example, that authorized users can access easily from multiple locations.

2. Description of Related Art

Embodiments of the invention use the Internet for transmitting point-of-sale data between computing devices. The Internet has terminology specific to it. The following terms should assist in understanding the Internet in general and embodiments of the invention disclosed herein:

HTML: Hypertext Mark Up Language. The language that web-based documents are written in.

Browser: Software that allows you to interact with HTML documents.

IE: Internet Explorer. A commonly used browser.

URL: Uniform Resource Locator. The address of a web site.

Web Page: A single HTML document (it may be more than one page long when printed).

Web Site: A collection of pages written in HTML.

Home Page: The first page of a web site or the first page that a browser displays when it is started.

Download: The process of moving information from the Internet to your computer. When you look at a site in your web browser, the information is downloaded.

Upload: The process of moving information from your computer to the Internet.

HTTP: Hypertext Transfer Protocol. The method of moving HTML documents.

Hyperlink (link): The method of moving around an HTML document. Links can be graphics or text. Links can take you to another page in a site, to a different site, or to an e-mail form.

FTP: File Transfer Protocol. The method of moving non-HTML documents (such as graphic and daily extract files).

WWW: World Wide Web. An area of the Internet where web sites are stored. Also the first three letters of most URLs.

Internet: A collection of HTML documents that are accessible to users who have access to the Internet.

ISP: Internet Service Provider: A company that allows Internet users access to their computers. The company from which you rent the ability to connect to the Internet.

GUI: Graphical User Interface. Pronounced "gooey." A program that uses graphics to enable users to interface with information. IE, Windows 95 and Windows 98 are GUIs.

Point-of-sale systems have enjoyed tremendous popularity in the restaurant industry and other industries. Such systems typically perform data input and storage, and, in combination with back-office or back-of-the-house systems, perform corresponding analysis and output. Inventory control, suggestive selling prompts, accurate timekeeping and scheduling, remote access management, coupon usage and effectiveness analysis, purchase-order generation based on historical sales, and other record keeping and analysis activities are among the functions that such systems can perform.

SUMMARY OF THE INVENTION

Using the power and speed of the Internet, embodiments of the invention electronically collect and collate information from point-of-sale data sources. That information then is turned into custom-formatted reports that authorized users can access easily using any computer that has Internet access and a suitable web browser, e.g. Internet Explorer.

Embodiments of the invention work effortlessly, with little or no changes needed in the underlying technology infrastructure. Franchisees, for example, do not need to invest in expensive additional equipment or software, according to embodiments of the invention. Additionally, administrative tasks can be performed by just one person (depending on the number of stores in the franchise or other operation). Often the biggest hurdle to implementing new technology is the cost of equipment and/or personnel. In most cases, however, embodiments of the invention remove both of those hurdles, making it easier to receive quality, meaningful information about a business, e.g. a franchise operation.

By using the Internet, users with appropriate permission can set up their own report subscriptions and can request reports on any combination of stores for any range of dates, for example. Additionally, although reports are delivered over the Internet and are displayed using browser technology, the access web site is protected by appropriate security strategies. A valid user name and password are required, and automatic log-out occurs when a user leaves the site inactive for more than a desired time period, e.g. 15 minutes. Additionally, the data is in read-only format, so general users do not have the ability to make changes to the data source.

Other advantages and features of the invention in its various embodiments will be apparent from the remainder of this patent application.

BRIEF DESCRIPTION OF THE DRAWINGS

Embodiments of the invention will be described with respect to the figures, in which like reference numerals denote like elements, and in which:

FIG. 10 shows a screen including a restaurant selection box, according to an embodiment of the invention;

FIG. 16 shows a Periodic Sales Report request screen, according to an embodiment of the invention;

FIGS. 17–18 show a Data Grouping drop-down list on the FIG. 16 screen;

FIG. 22 shows end date and begin date boxes for use in requesting a subscription, according to an embodiment of the invention;

FIG. 23 shows a portion of a new subscription request screen, according to an embodiment of the invention;

FIG. 25B shows a second portion of a Sales Mix sample report, according to an embodiment of the invention;

FIG. 27 shows a Price Variation sample report, according to an embodiment of the invention;

FIG. 28 shows a Planned Sales sample report, according to an embodiment of the invention;

FIG. 30 shows a Menu Item sample report according to an embodiment of the invention.

DETAILED DESCRIPTION OF PREFERRED EMBODIMENTS

Embodiments of the invention have wide application to a variety of businesses and business operations. Although primary embodiments of the invention will be described with respect to point-of-sale systems in restaurants, and, more specifically, to generating custom-formatted reports based on the point-of-sale data, the invention is not necessarily limited to those embodiments.

The following terminology may be helpful in understanding certain embodiments and features of the invention:

Accounting Dates: A calendaring system that divides a year into 13 28-day periods. Accounting dates appear in day/week/period/year (D/W/PP/YY) format. For instance, 4/3/11/99 means the $4^{th}$ day of the $3^{rd}$ week in period 11 of 1999. This system is different than those used in certain back-office computer systems, which use a period/week/day/year (PP/W/D/YY) format and where the day mentioned previously would be represented as 11/3/4/99.

Calendar Dates: Dates as they are generally used in the United States. Calendar dates are displayed in month/date/year (MM/DD/YY) format.

Data Source: The information that is downloaded from the point-of-sale system in each store. Also called the "daily extract (TBE) file."

POS System: Point of sale system. The equipment and related software that gather information at the point of sales, often including a cash register.

Comparable: An option that can be chosen, while requesting some reports, that instructs embodiments of the invention to adjust the outcome of reports that have both a current and a prior period to include data from the daily extract file only if the data appears in both periods. For instance, say a user requests a Sales Mix Report, to be described, for both the current week and the same week one year ago for a certain district. If the franchisee has added a new store to that district in the last few months, turning on the Comparable feature excludes the new store from the current period in this report only.

ICOS: Ideal Cost of Sale. The amount that it costs to make an item, e.g. a menu item, if it is made using the correct amount of each ingredient or raw material.

Figure 1:
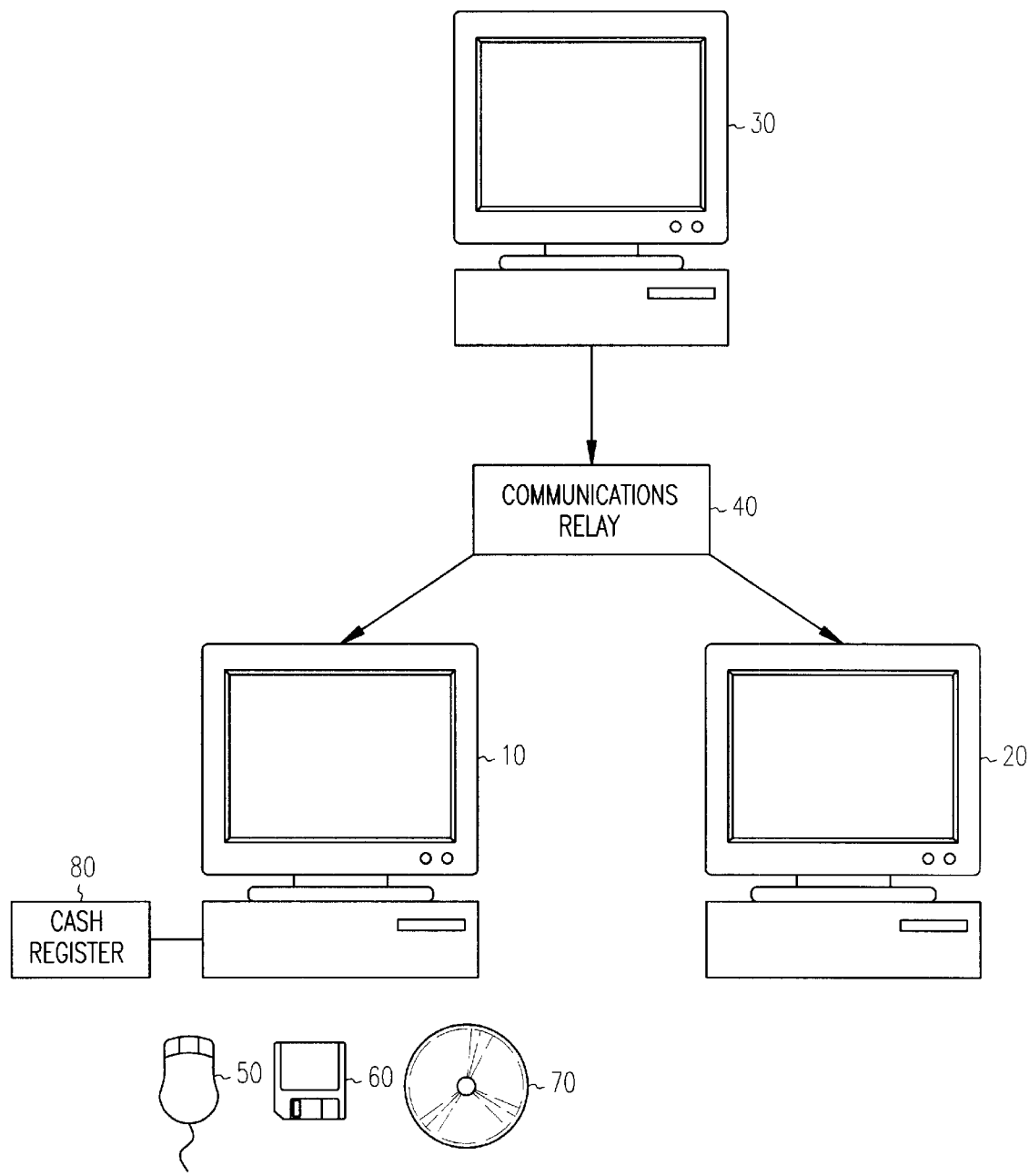
FIG. 1 is a schematic diagram showing a computer system according to an embodiment of the invention.

Referring to FIG. 1, embodiments of the invention generate custom reports based on point-of-sale data transferred over the Internet between multiple remote computing devices 10, 20 and central computing device 30. Communication relay 40 is provided to communicate e.g. electronic signals relating to or representing the data. Communication relay 40 preferably includes or is embodied in the Internet in its various forms and definitions, including e-mail and other communication mechanisms. Of course, the invention contemplates using future generations of the Internet, e-mail communication systems and other new forms of electronic communication that may arise.

To simplify the disclosure, only two remote computing devices 10, 20 are illustrated in FIG. 1. Embodiments of the invention, however, contemplate a much larger number of such computing devices. The computing devices, and/or their respective locations, can be organized into multiple hierarchical or organizational units, as will be described. Additionally, although only one central computing device 30 is illustrated, embodiments of the invention contemplate multiple central computing devices 30 if needed or desired for a particular application or environment.

Remote computing devices 10, 20, as well as central computing device 30, include various input/output, memory, storage and other devices such as mouse 50, disk 60, CD-ROM 70 and other computer-readable media for storing computer programs, data and other information. Additionally, each remote computing device 10, 20 preferably is operably connected to or itself includes traditional point-of-sale equipment known in the art, such as cash register 80 and/or associated equipment.

Figure 2:
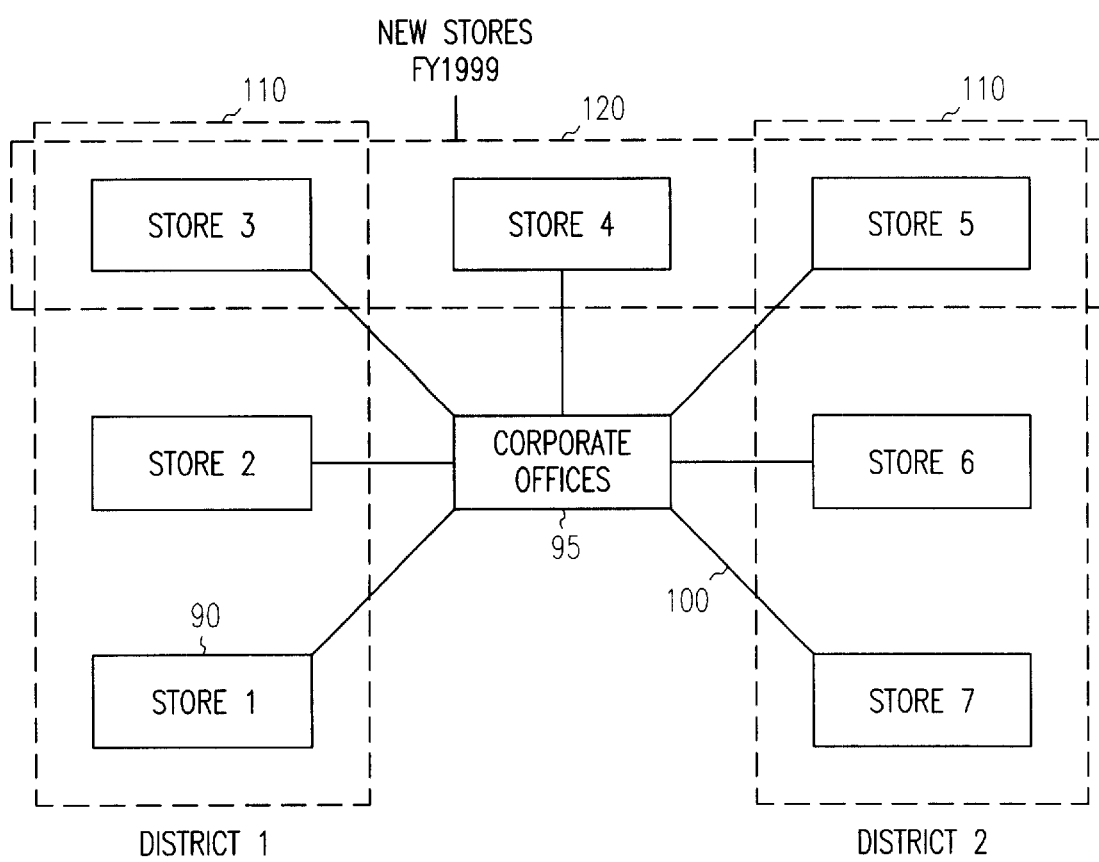
FIG. 2 is a schematic diagram showing locations and organizational units, according to an embodiment of the invention.

Turning to FIG. 2, multiple restaurants, stores, retail sales facilities or other remote locations 90 are illustrated, each having a separate store identification number as shown. Each location 90 communicates by an appropriate direct communication link 100 to central location 95, and/or by the more centralized communication relay 40 of FIG. 1. Each remote location 90 includes one or more remote computing devices 10, 20, preferably connected to a communications interface. Central location 95, such as the corporate offices of a business, includes one or more central computing devices 30.

According to embodiments of the invention, central location 95 can be temporarily or permanently moved to one of the remote locations 90, and the terms "central location" and "remote location" should be so interpreted as appropriate. An owner of multiple franchise locations, for example, can monitor franchise operations not only from a corporate office, but also from one of the remote locations at which a temporary or permanent "central office" has been set up.

Stores 90 are organized into organizational units, according to embodiments of the invention. According to one embodiment, these units comprise geographic districts 110, as illustrated in FIG. 2. Alternatively, the organizational units can be districts or divisions that rely on other than geographical divisions. They can also be of a more conceptual nature, such as fiscal year units 120 denoting the year in which a particular store began operations. Significantly, each store or other location 90 can be assigned to any number of organizational units. For example, store 3 in FIG. 2 is in both unit 110 and unit 120. Organizational units can be defined in any manner desired for a particular application or environment.

Figure 3:
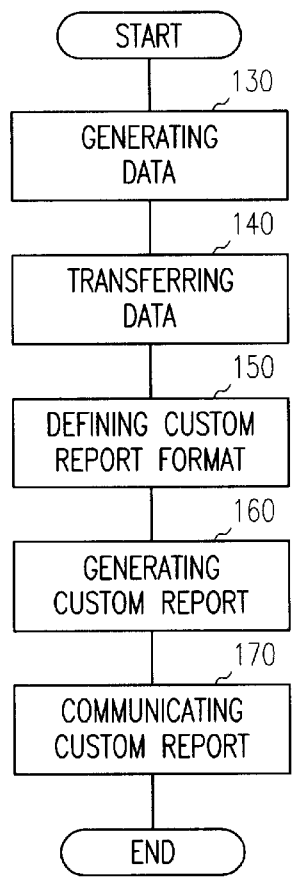
FIG. 3 is a flow chart according to an embodiment of the invention.

FIG. 3 illustrates one method embodiment according to the invention. As indicated at 130, the method includes generating data, such as point-of-sale data, at multiple remote locations. The data can be generated by a cash register, bar code scanner or other reader, or other device. The generating device is operably coupled to at least one computing device, or is embodied in a computing device, as described above.

At 140, the point-of-sale data is transferred to a central computing device from the multiple computing devices at the respective multiple remote locations. Each remote location can include one or more computing devices. According to one embodiment, the transfer occurs automatically by internal or external e-mail. Separate fields or specialized spacing within the body of the e-mail designate particular data, according to one embodiment. The transfer also can occur in other ways, such as by using other aspects of the Internet, by floppy disk, wireless link, satellite hookup, cellular network, or other known ways of transferring data from one computing device to another.

A custom report format is defined at 150. According to one embodiment, the custom report format specifies at least two of the multiple remote locations and specifies a date range. The date range and the locations are freely selectable by a user, as will be described.

A custom report then is generated at 160, using the custom report format. More specifically, the custom report is based on the e.g. point-of-sale data related to the remote locations and date range specified and freely selected by the user.

At 170, the custom report is communicated to a human being, such as a corporate officer, a franchise owner or manager, or other interested party at either the central location or at one or more of the remote locations. The custom report can be communicated by direct display at one of the computing devices, by e-mail to a designated party, otherwise over the Internet, in hard copy, or in the other ways described above.

Specific embodiments of the invention particularly directed to the restaurant industry now will be described with reference to FIGS. 4–30. As referenced earlier, however, the invention applies to other computing environments and industries, not just the restaurant industry. Further, as technology advances, the invention likely will use other modes of communication and interaction with the Internet, not just those known at present.

According to one embodiment, a user of the disclosed system has a computer, for example a standard personal computer, with a recent version of an Internet browser, e.g. Internet Explorer. According to one embodiment, the browser should have the Active X Controller loaded and incorporated. An Internet connection or other connection with a suitable communication mechanism is also desirable. To receive reports received by e-mail, it is desirable for a user to have standard data decompression software, such as WinZip.

At least two types of users are contemplated, each with their own permissions and assigned capabilities to use the system. General users will have different permissions than administrators, for example. Specifically, in the restaurant industry, a restaurant general manager is able to access only information about the store or stores that he/she manages. A district manager can access any or all of the stores for which he/she has responsibility. Officers at the corporate level, owners, or other persons higher up in the organization, can see data for all stores. Administrators have the right to make changes to how the system is configured, the power to create user profiles and passwords, and the ability to update the system to reflect acquisition of new stores, changes in menu items or pricing, or other changes.

Figure 4:
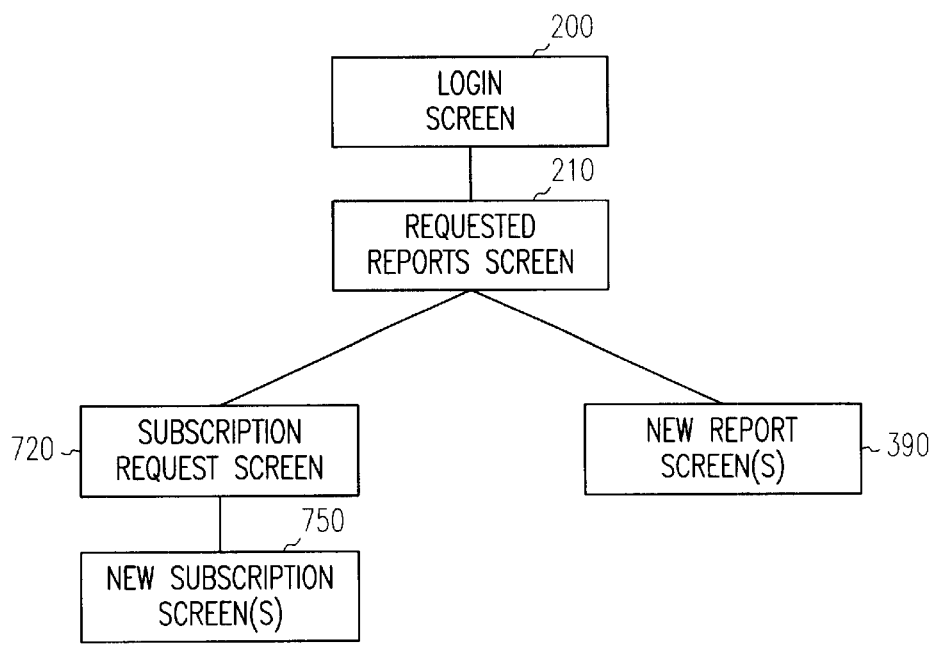
FIG. 4 is a screen map diagram, according to an embodiment of the invention.

The first step in using the system is to access a login screen, step 200 of FIG. 4. After connecting to the Internet, for example, the web browser can be directed to the URL for the login page. For future logins, a desktop shortcut can be created to the login page, the page can be made a "favorite" or "bookmark" in the browser, or the page can be made the home page for the browser.

Figure 5:
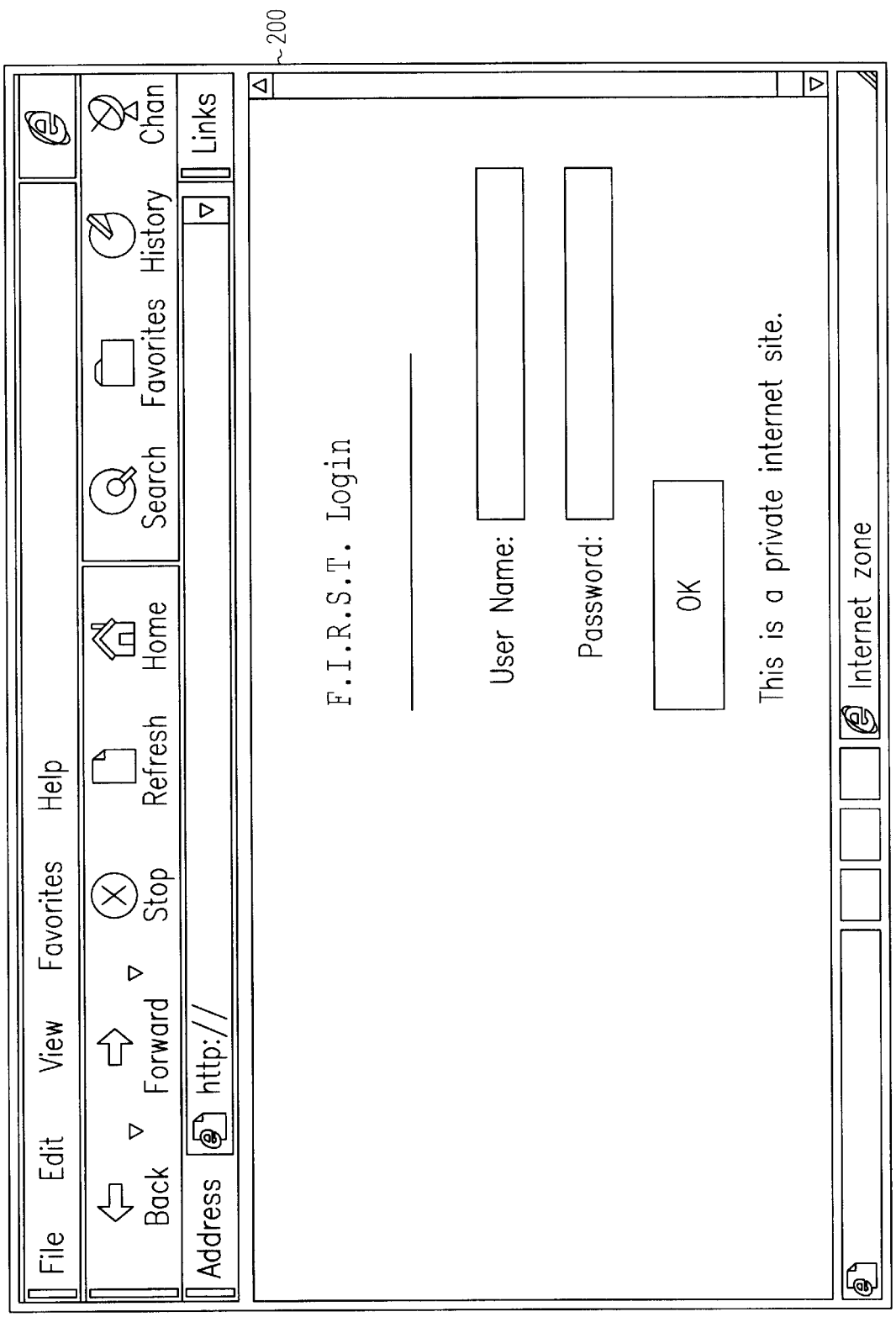
FIG. 5 shows a log-in screen, according to an embodiment of the invention.
Figure 6:
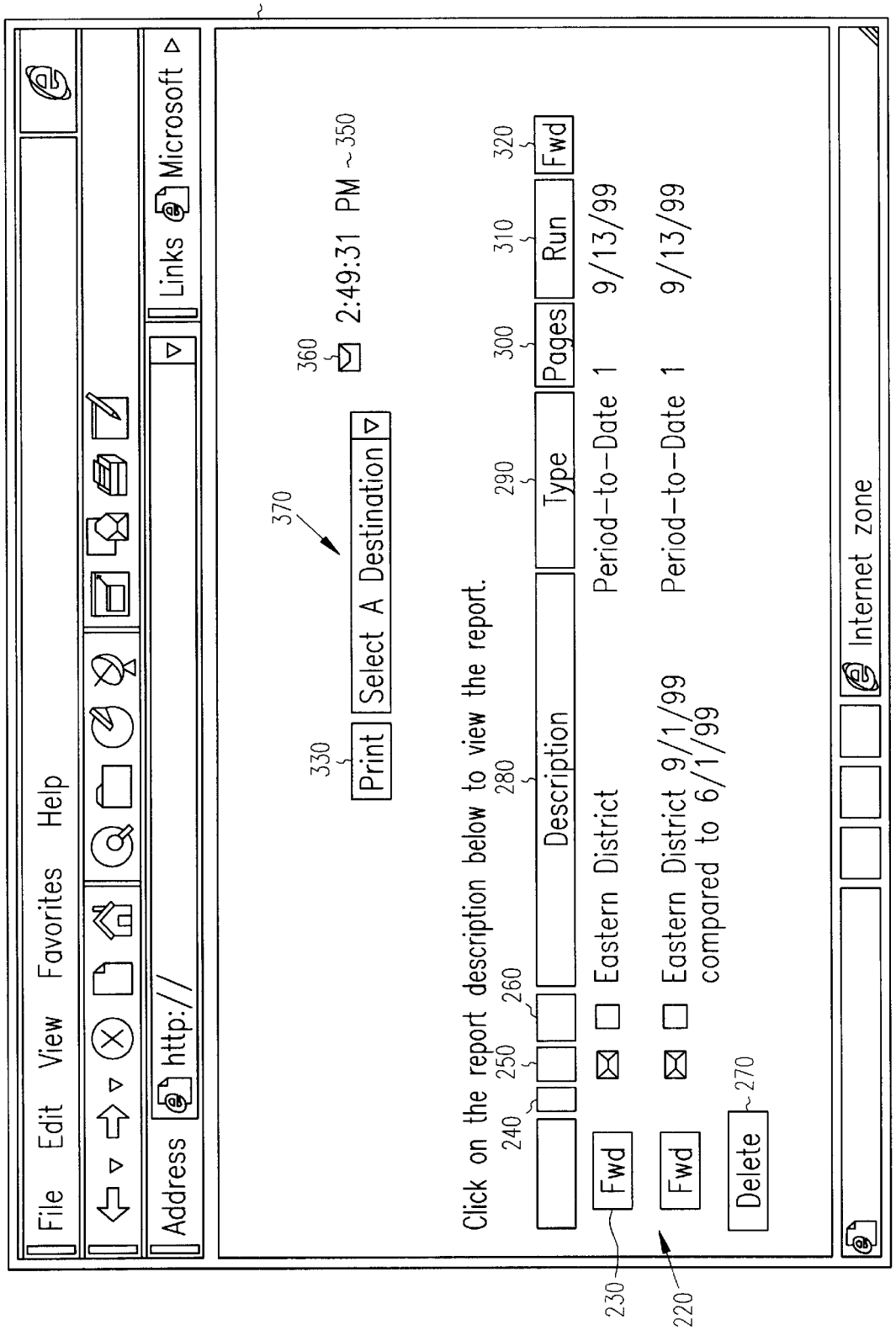
FIG. 6 shows a requested reports screen, according to an embodiment of the invention.

One specific login page 200 according to an embodiment of the invention is shown in FIG. 5. The user name and password fields are case sensitive. When a correct user name and password are entered, requested reports screen 210 appears. One such requested reports screen is illustrated in FIG. 6. Requested reports screen 210 is the starting point for requesting reports, setting up subscriptions, viewing lists of requested reports and performing other functions.

Requested reports are listed in report detail area 220 of screen 210. Reports remain listed in area 220 until they are actively deleted by the user, according to one embodiment. Unread reports appear first on the list, followed by read reports. Reports can be added to area 220 by directly requesting them, or by having them sent to the user by the subscription or forward functions, to be described.

Report detail area 220 includes a number of columns of information. In the leftmost column, forward button 230 allows a user to forward a report that already has been run. Importance indicator column 240 shows if a report has been requested with high priority, denoted by a red exclamation point or other symbol. Column 250 indicates the read or unread status of a report, a report that has been read showing an open envelope, for example. Column 260 includes "to be deleted" boxes. If a check mark appears in the box for a specific report, the report will be deleted the next time the user clicks delete button 270. Description column 280 displays the description given each report at the time that it was requested. The type of report requested is shown in column 290, the number of pages in column 300, the run date in column 310, and any persons to whom the report was forwarded in column 320.

To open a report, its description in column 280 is "clicked" or otherwise designated. To print a report, the description is clicked and the report appears on the screen, e.g. in the lower portion of screen 210 in a manner to be described. With the report appearing on the screen, print button 330 is clicked. Print parameters, such as print range, may be requested by the site at that time.

To forward a report to another user, forward button 230 is clicked, a report description and delivery method information entered, and a submit button clicked. The report will be forwarded by e-mail or other desired communication method. Reports can be forwarded to other users of the system by web or e-mail delivery, or to non-users of the system by e.g. any valid e-mail address.

The reports listed in area 220 can be sorted in ascending or descending alphabetical or other order by clicking the appropriate column heading one or more times. The time of day can be displayed at 350, and 360 is an icon that indicates whether a requested report has been generated and is ready for viewing by the user.

Figure 7:
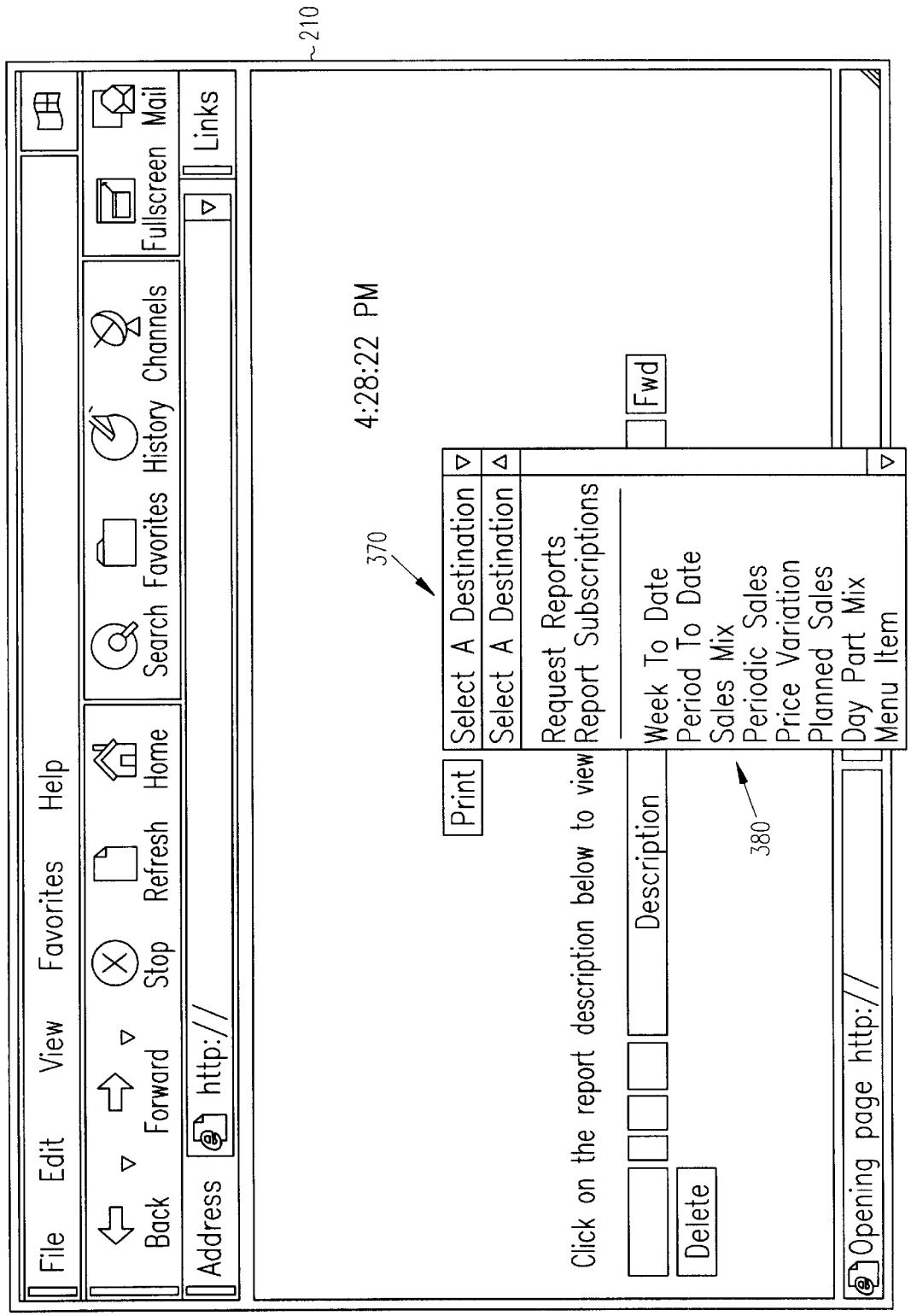
FIG. 7 shows a requested reports screen with expanded drop-down list, according to an embodiment of the invention.

Drop-down list 370 is shown in inactive form in FIG. 6 and active form in FIG. 7. To update the contents of requested reports screen 210, the "Requested Reports" item can be selected from list 370. Alternatively, the standard browser refresh icon can be clicked. To view current report subscriptions, the "Report Subscriptions" item list in 370 is chosen. To request a specific report, the appropriate report name in area 380 of list 370 is chosen. According to the FIG. 7 embodiment, eight such reports are available: Week To Date, Period To Date, Sales Mix, Periodic Sales, Price Variation, Planned Sales, Day Part Mix, and Menu Item. Specific aspects and features of these reports are described below. Of course, any number of additional reports can be generated and are contemplated by the invention, such as Ranking Reports, described below.

Once a report type is selected from list 370, the user is presented with one or more new report screens, as indicated at 390 in FIG. 4.

Figure 8:
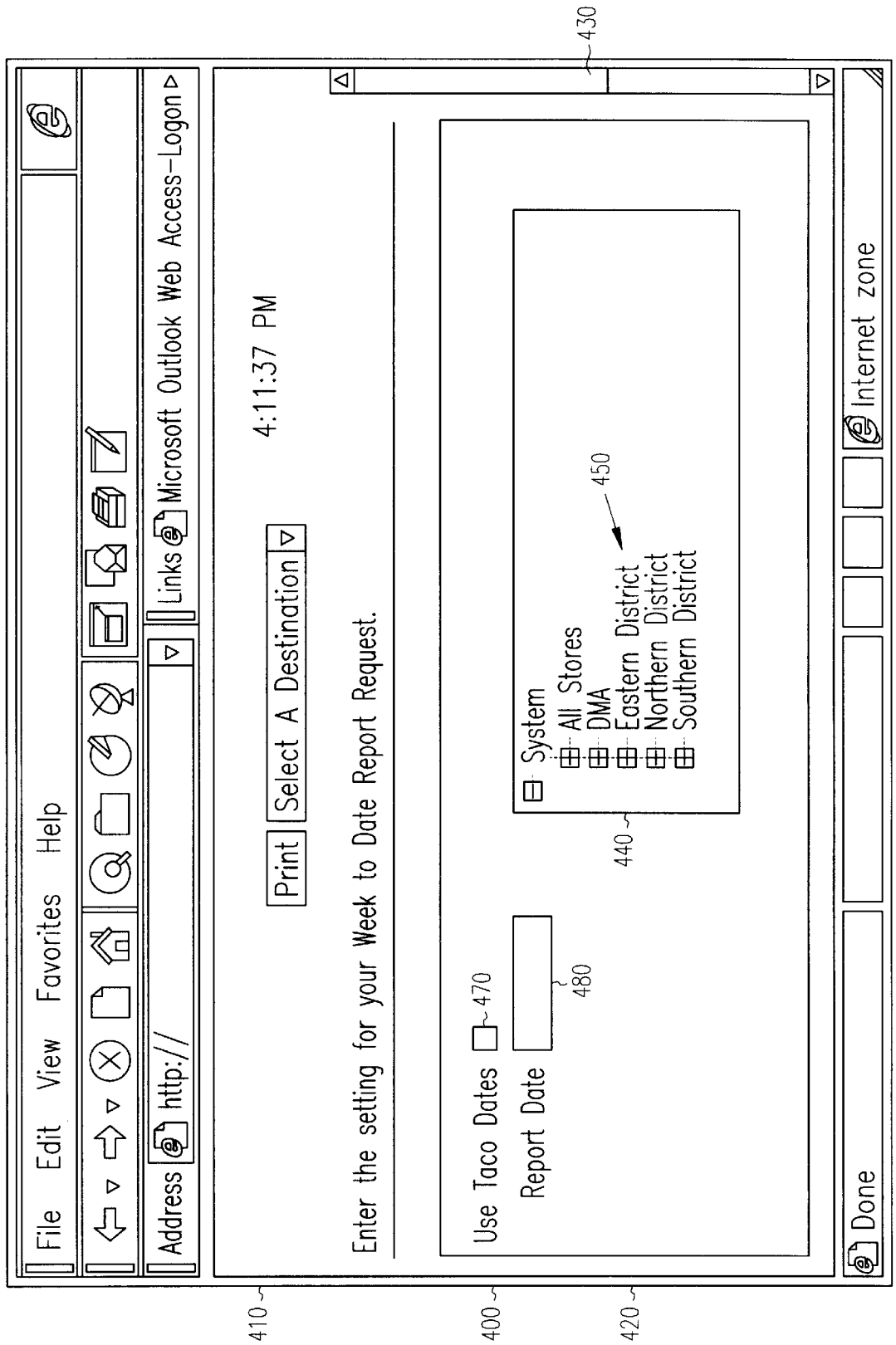
FIG. 8 shows a week-to-date report request screen, according to an embodiment of the invention.
Figure 9:
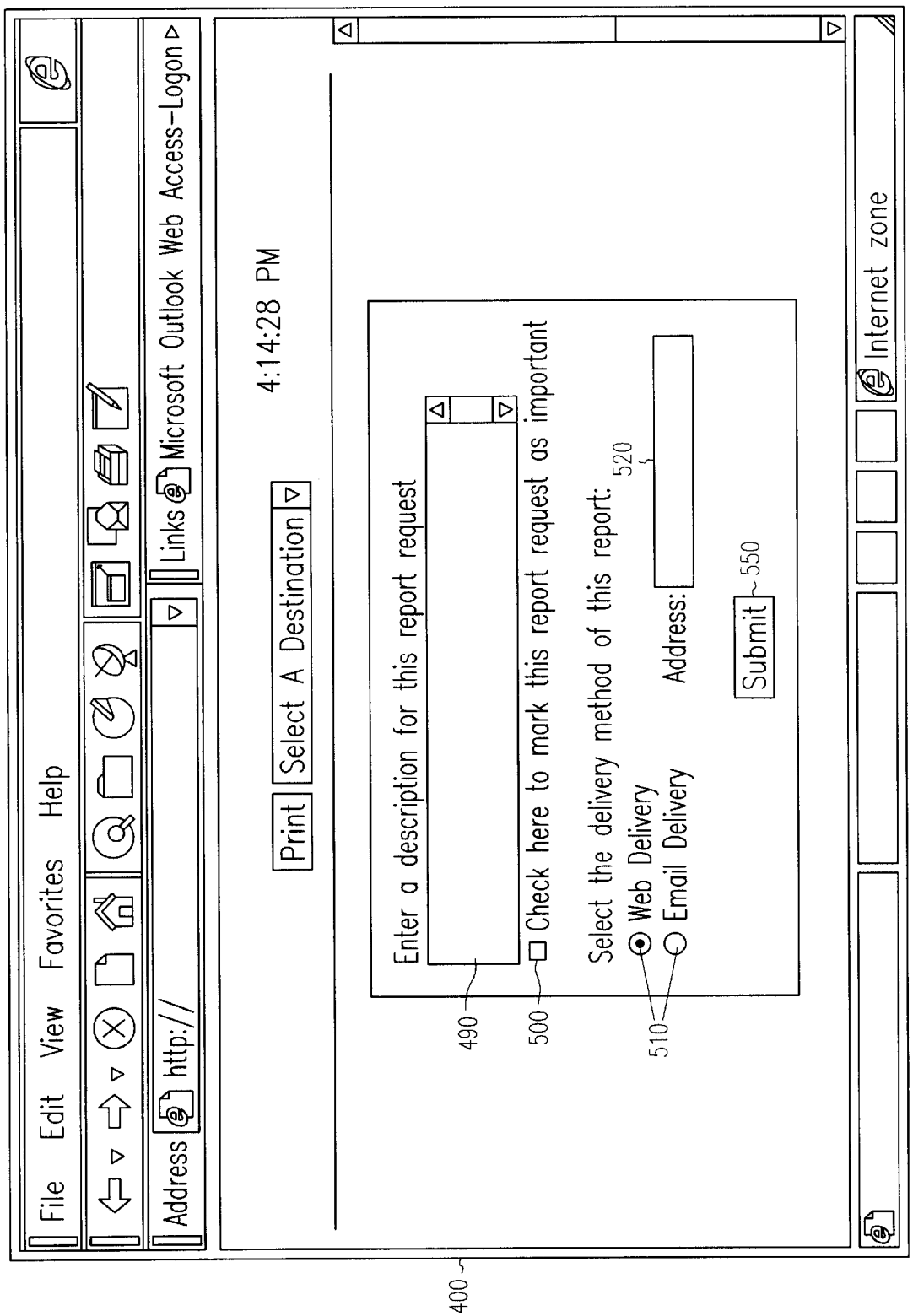
FIG. 9 shows another portion of the FIG. 8 screen.
Figure 11:
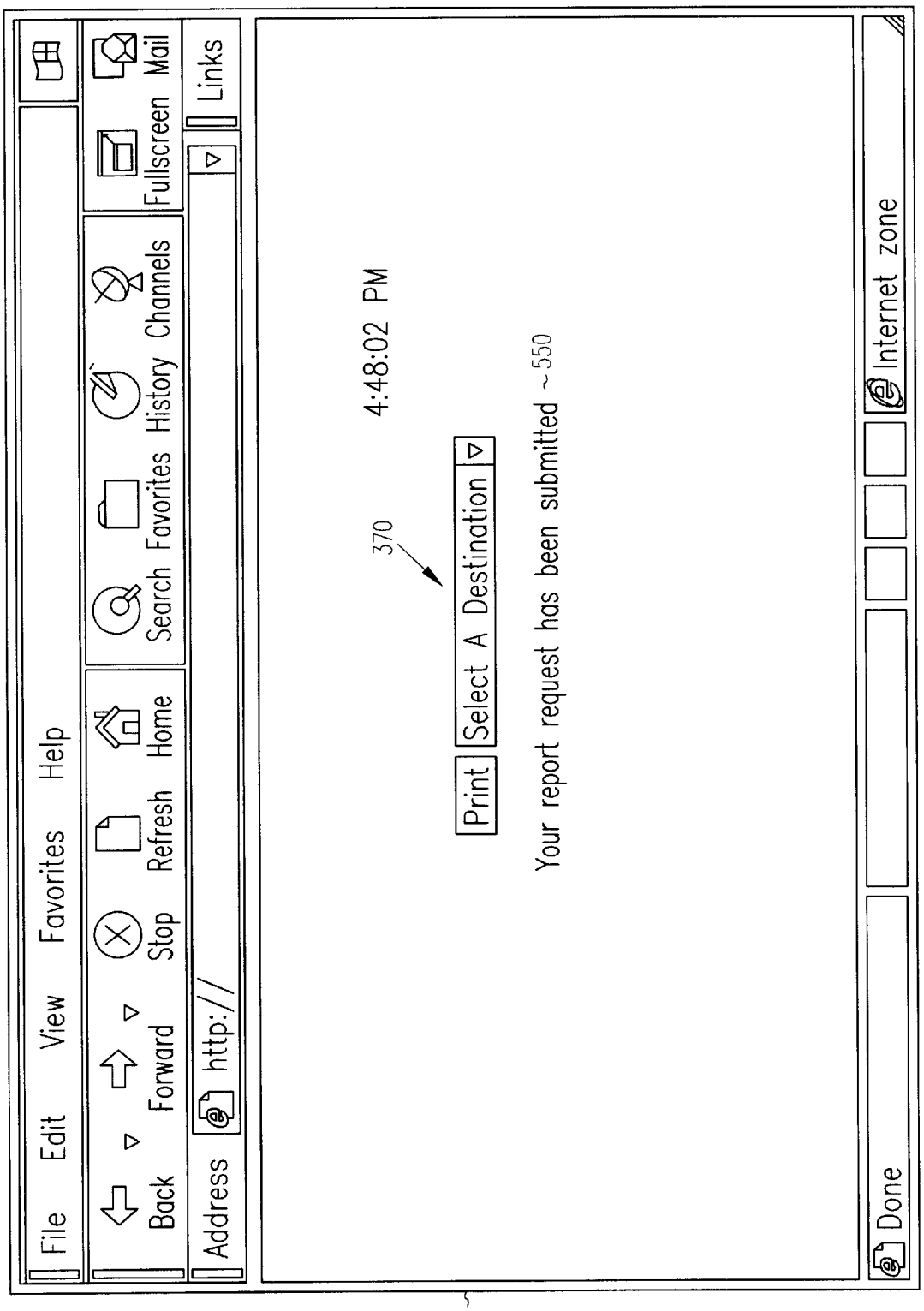
FIG. 11 shows an acknowledgement screen, according to an embodiment of the invention.

One specific new report screen, a Week To Date report request screen, is illustrated in FIGS. 8–9. Screen 400 is divided into an upper portion 410, which remains substantially fixed, and lower portion 420, which itself has upper and lower portions as indicated by vertical scroll bar 430. FIG. 8 illustrates the top half of portion 420 and FIG. 9 illustrates the lower half of portion 420.

Figure 10:
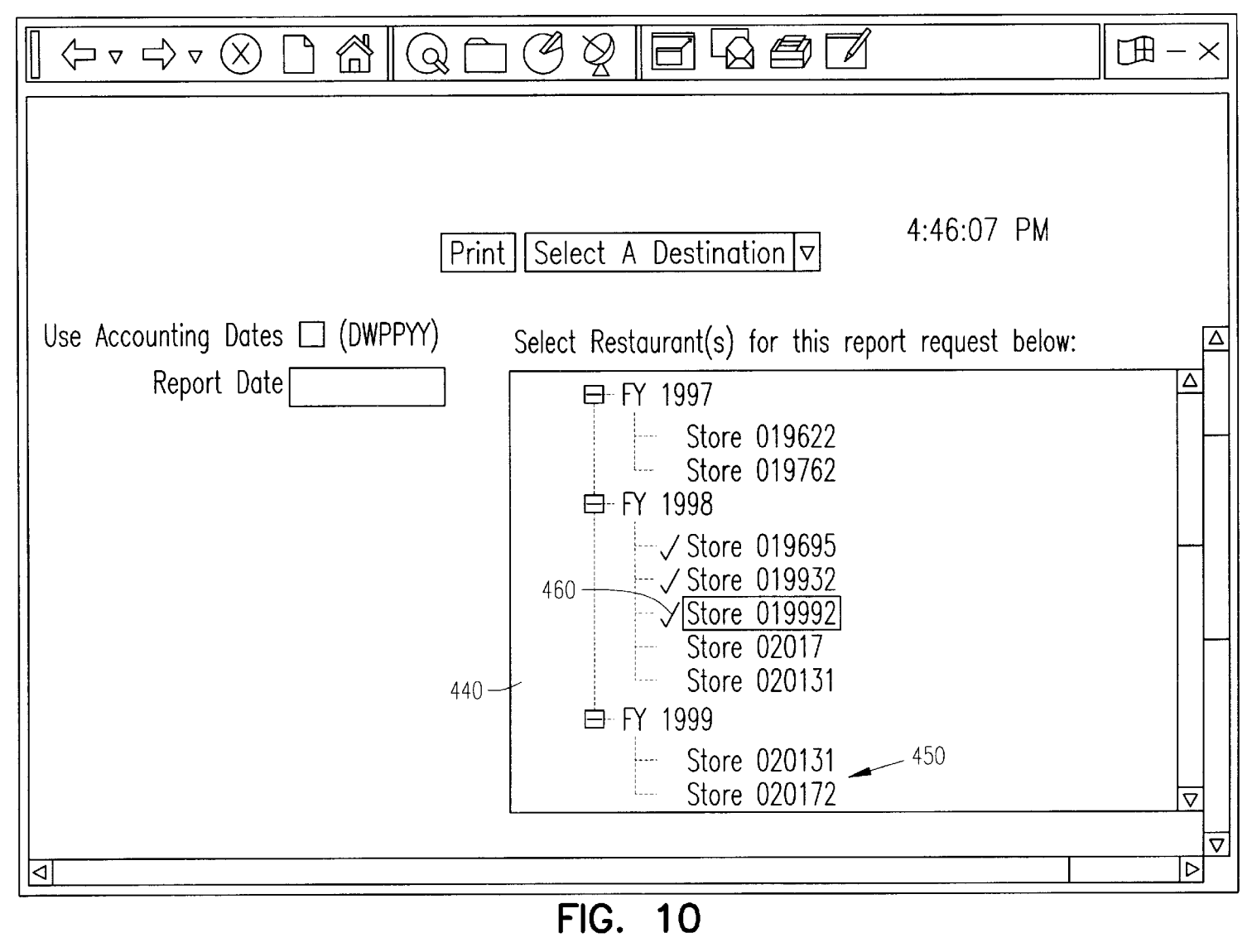

Screen 400 includes restaurant selection box 440. Box 440 presents a hierarchical list of all restaurants available to the user, presented in groups 450 such as the organizational units described above. Significantly, one restaurant can appear in more that one group. The plus symbol (+) in front of a group name means that the group itself contains additional items, e.g. more groups and/or stores. To see the groups/stores in that group, the user clicks the plus symbol. When all items in that group are shown, the plus symbol is changed to a minus symbol (–), as indicated in FIG. 10.

In other words, to choose groups/stores in box 440, the user clicks the plus symbol in front of the highest group in the hierarchy, expanding the list. The list continues to be expanded until the user sees the group/store desired for the report in question. The empty space in front of the group/store name is clicked, and check mark 460 or other appropriate symbol appears, as shown in FIG. 10. Groups/stores may be selected in any combination for each report. To unselect a selected store, check mark 460 is clicked once, making it disappear.

Box 440 is the subject of Active X Control, according to this embodiment. Appropriate software, controls or other electronic information can be downloaded automatically to the user's personal computer or other computing device to activate and enable box 440. Dates box 470 allows the user to choose the date format in which the desired date range will be specified. Accounting dates, calendar dates, "taco" or other proprietary system date formats can be selected. Accounting dates help ensure the user is comparing like periods of time, but any date format can be used according to embodiments of the invention.

Report date box 480 accepts the date variables for the requested report, in the format specified by the user. Depending on the report requested, there may be multiple report date fields. The Week To Date report request of FIG. 8, however, requires only one field.

For generating comparables, a comparable box (not illustrated in FIG. 8) can be provided on screen 400, preferably underneath report date box 480 or in another readily accessible location. The comparable box enables the user to adjust the outcome of a report, if it has a current period and a prior period, to include data from the daily extract file only if the data appears in both periods, as described above. For example, if a user requests a Week To Date report for the current week and the same week one fiscal year ago, for a particular district, and a new store has been added to that district recently, activating the comparable feature would exclude the new store from the current period in the current report.

In FIG. 9, a report description can be entered in box 490. The report description will appear in column 280 of FIG. 6, as previously described. Because the run date and report type are already shown on requested reports screen 210, the most helpful information to include in description box 490 often is the date range and/or store grouping.

Importance box 500 can be checked to activate column 240 of requested reports screen 210. Delivery method is selected at 510. According to the illustrated embodiment, the delivery method can be either web or e-mail delivery. If web delivery is chosen, the report will appear on requested reports screen 210 once the request has been processed. If e-mail delivery is requested, the report will not appear on the requested reports screen. Instead, it will be forwarded to the e-mail address entered in box 520.

Once all of the relevant information is entered, the user clicks submit button 530. If the user has omitted any item of necessary information, a message will appear prompting the user to enter the information in the appropriate field. Otherwise, an acknowledgement screen, such as screen 540 in FIG. 11, appears with acknowledgement 550. The user can then request another report or simply wait for the requested report to appear.

Figure 12:
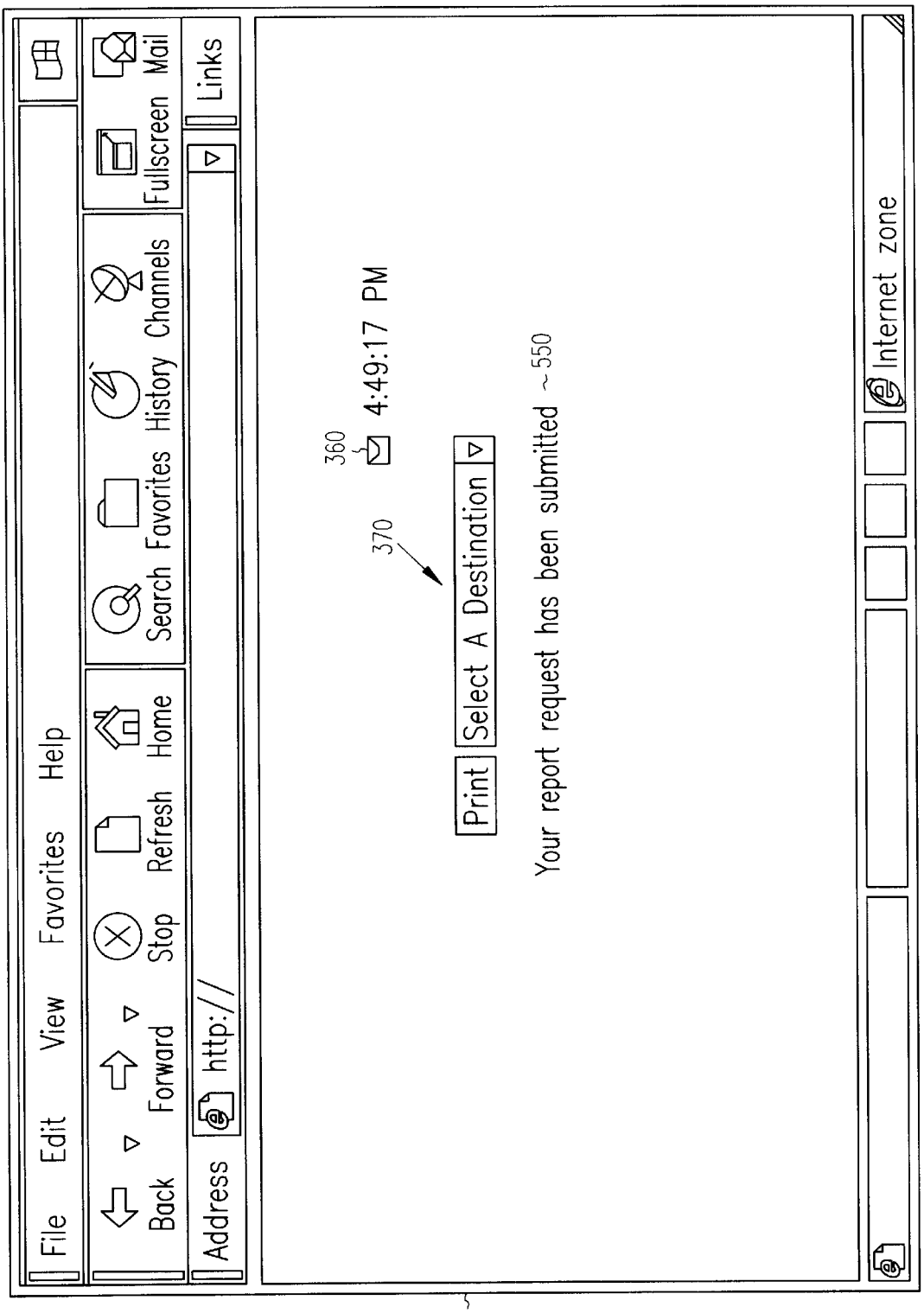
FIG. 12 shows the FIG. 11 screen with a notifier icon.
Figure 13:
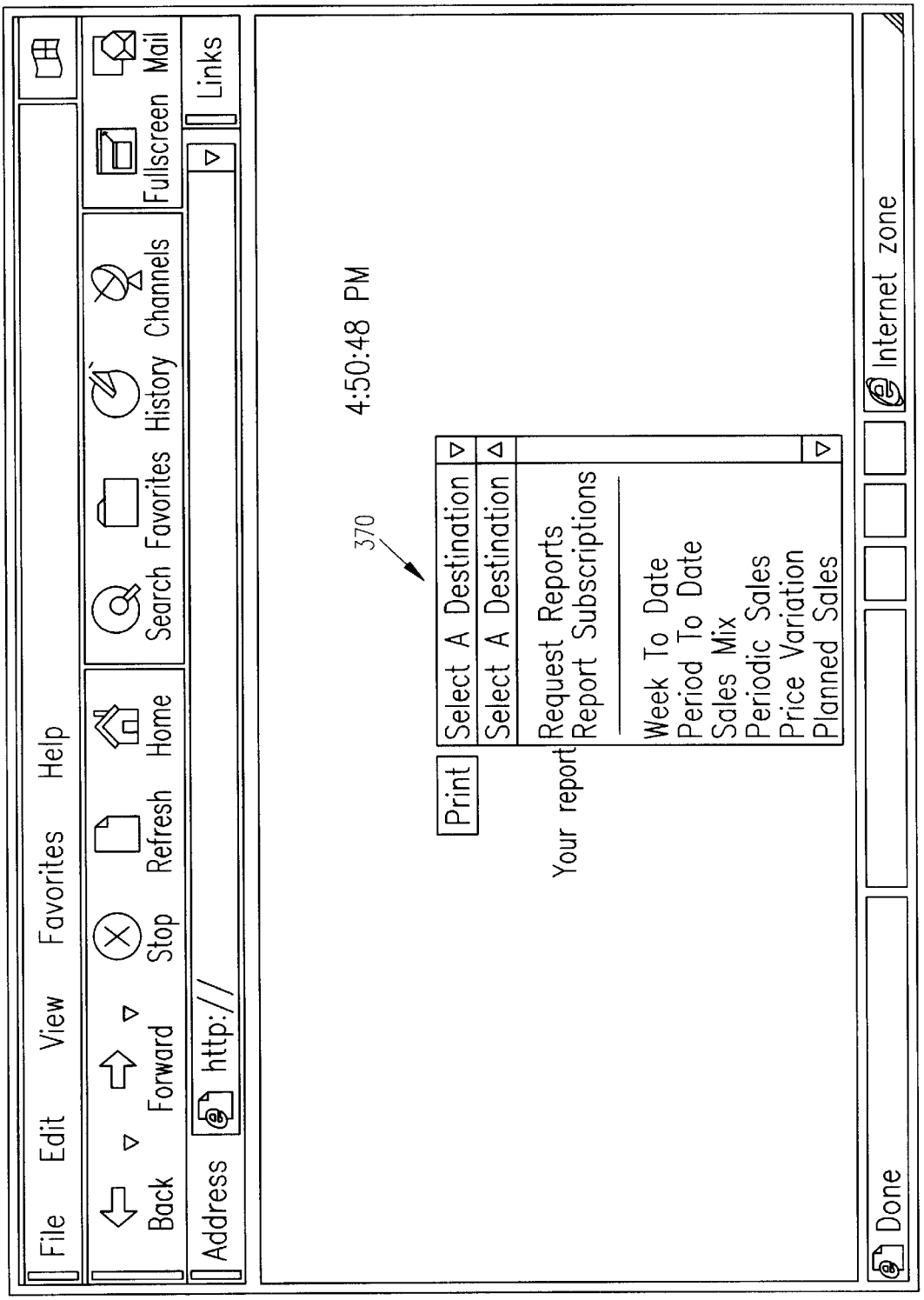
FIG. 13 shows the FIG. 12 screen with a drop-down list having a highlighted item, according to an embodiment of the invention.
Figure 14:
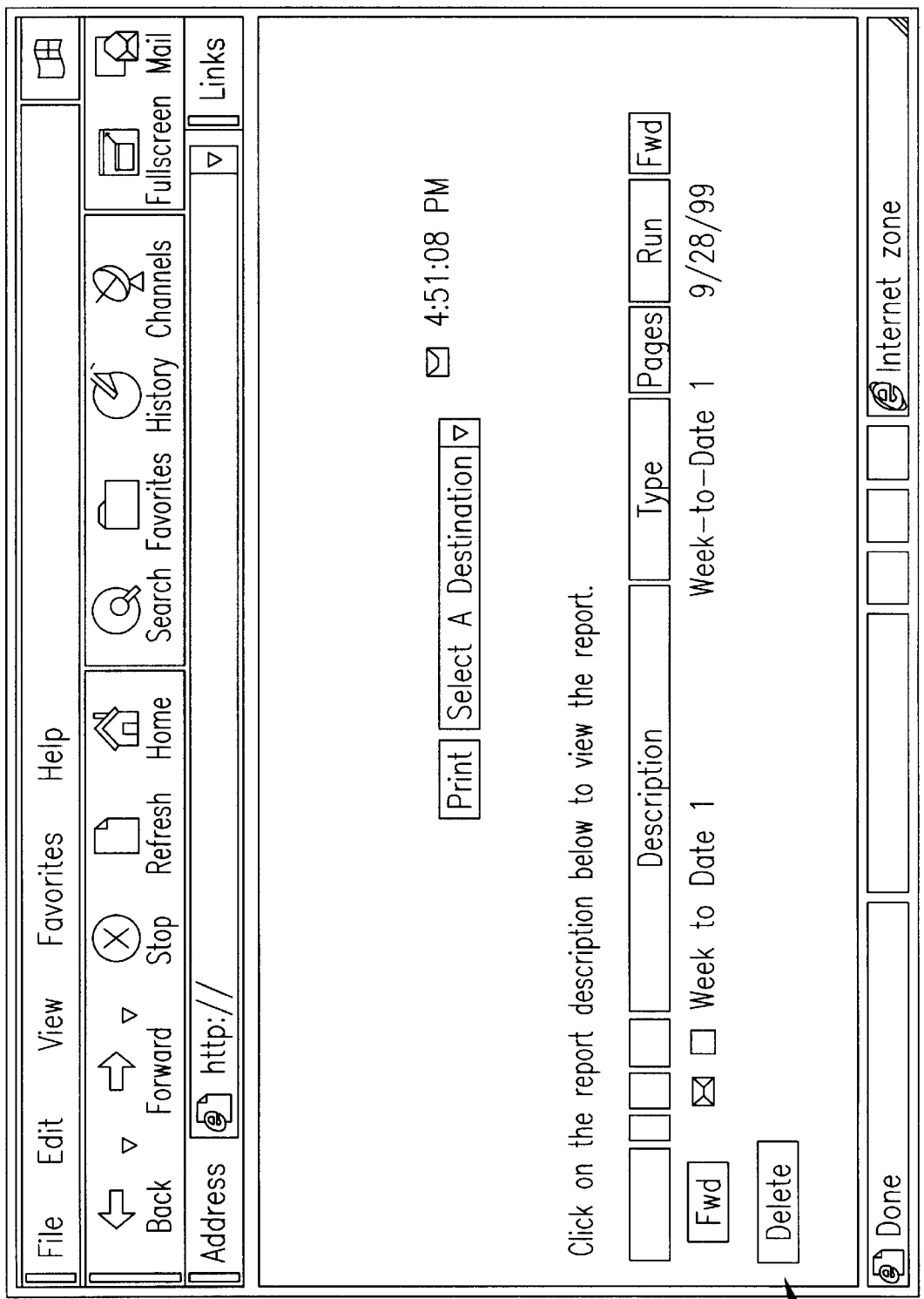
FIG. 14 shows a screen listing a requested report, according to an embodiment of the invention.

If the user simply waits, envelope 360 or other suitable icon appears on the same acknowledgement screen 540, as shown in FIG. 12. The user then highlights the "Requested Reports" item in drop down list 370, as shown in FIG. 13. Shortly thereafter, the requested report appears in area 220, as shown in FIG. 14. Other reports then can be generated and added to the list of requested reports in area 220.

Figure 15:
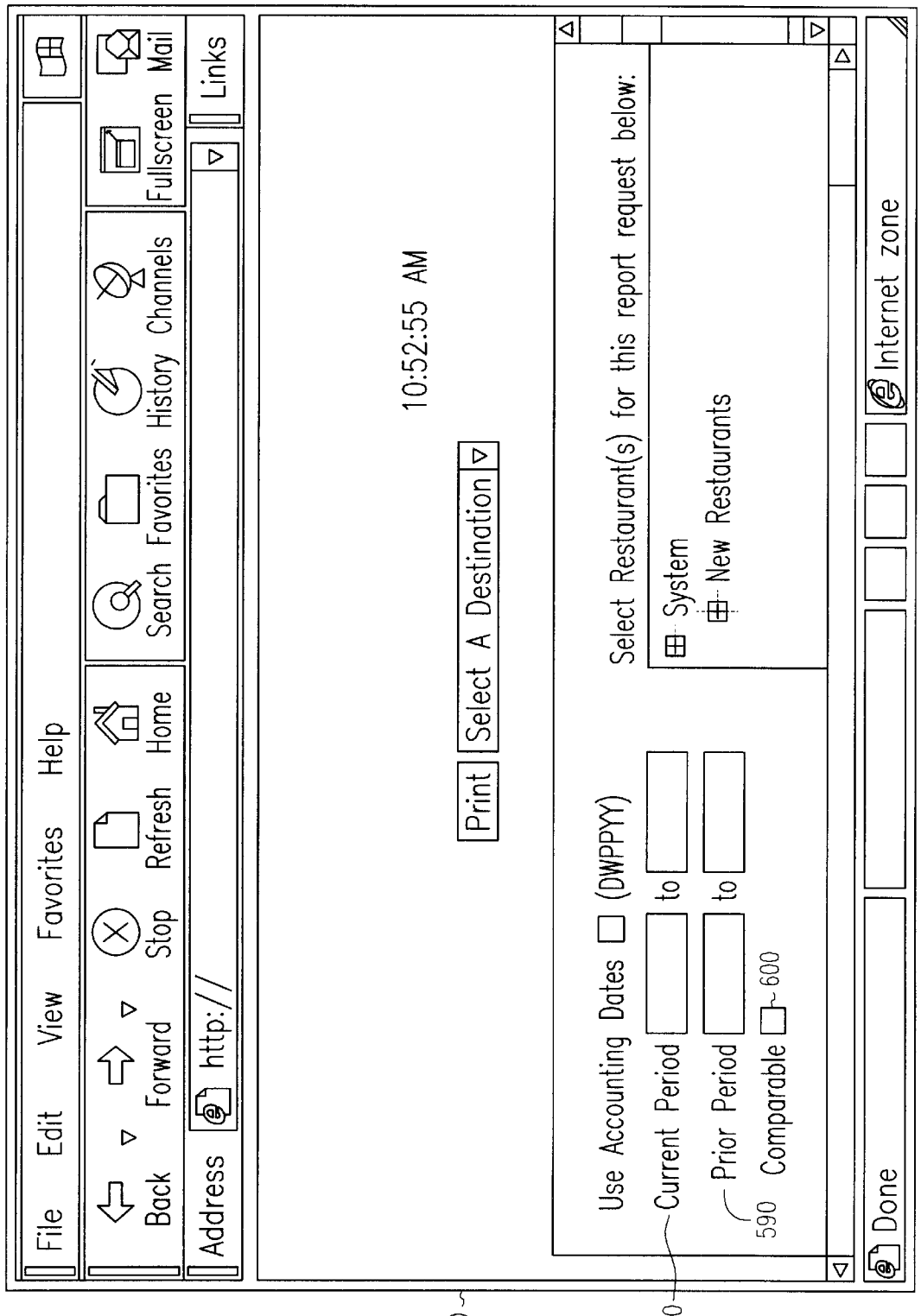
FIG. 15 shows a Sales Mix Report request screen, according to an embodiment of the invention.

Other new report screens 390 (FIG. 4) are shown in FIGS. 15–20. FIG. 15 shows Sales Mix Report request screen 570, with current period boxes 580, prior period boxes 590 and comparable box 600, the function and use of which is described above.

Figure 16:
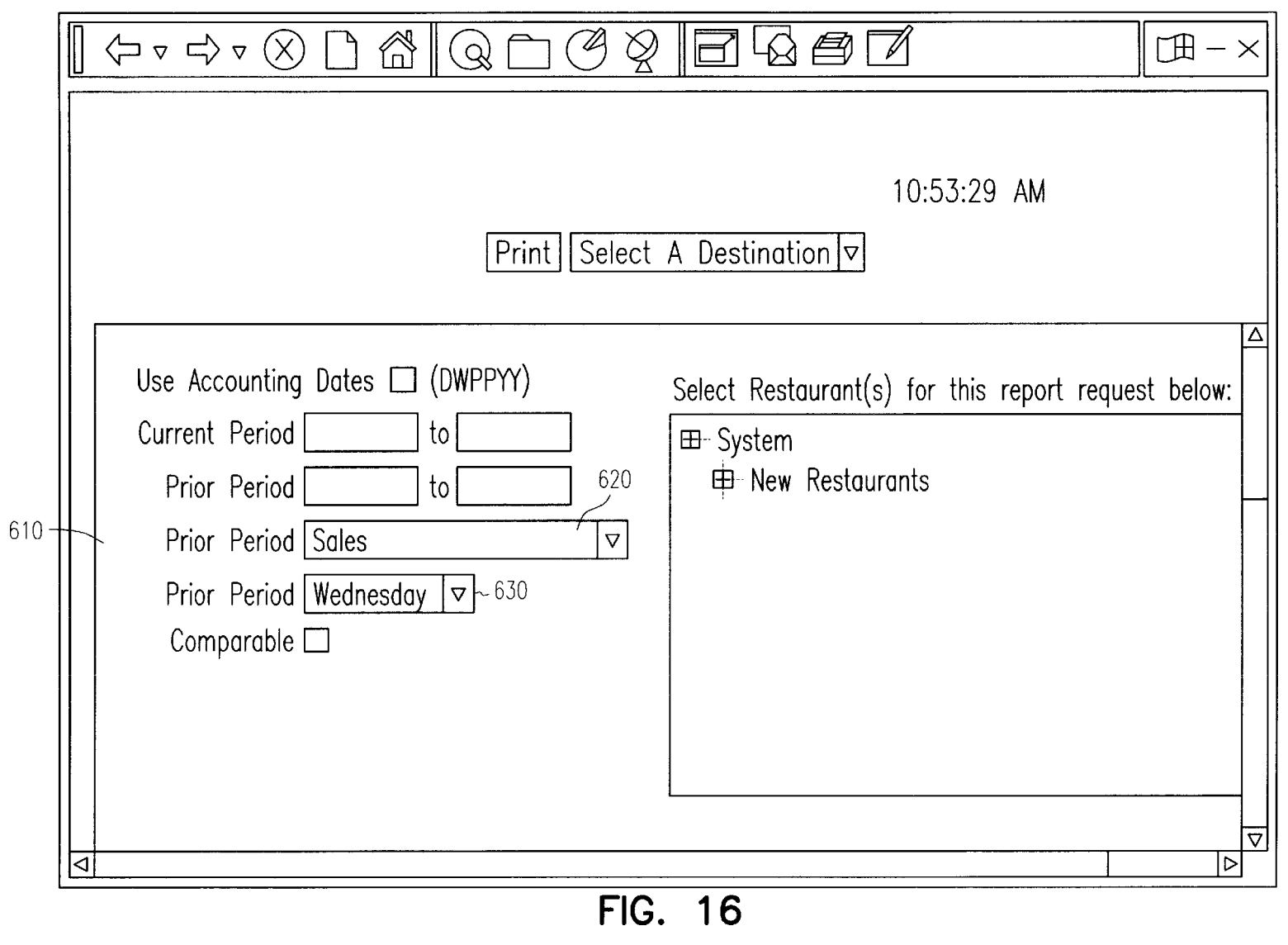

FIG. 16 shows Periodic Sales Report request screen 610. In addition to previously described boxes and fields, screen 610 includes data grouping drop-down list 620, illustrated in more detail in FIGS. 17–18. Date grouping drop-down list 630 includes choices for individual days of the week, the entire week, or the entire period.

Figure 19:
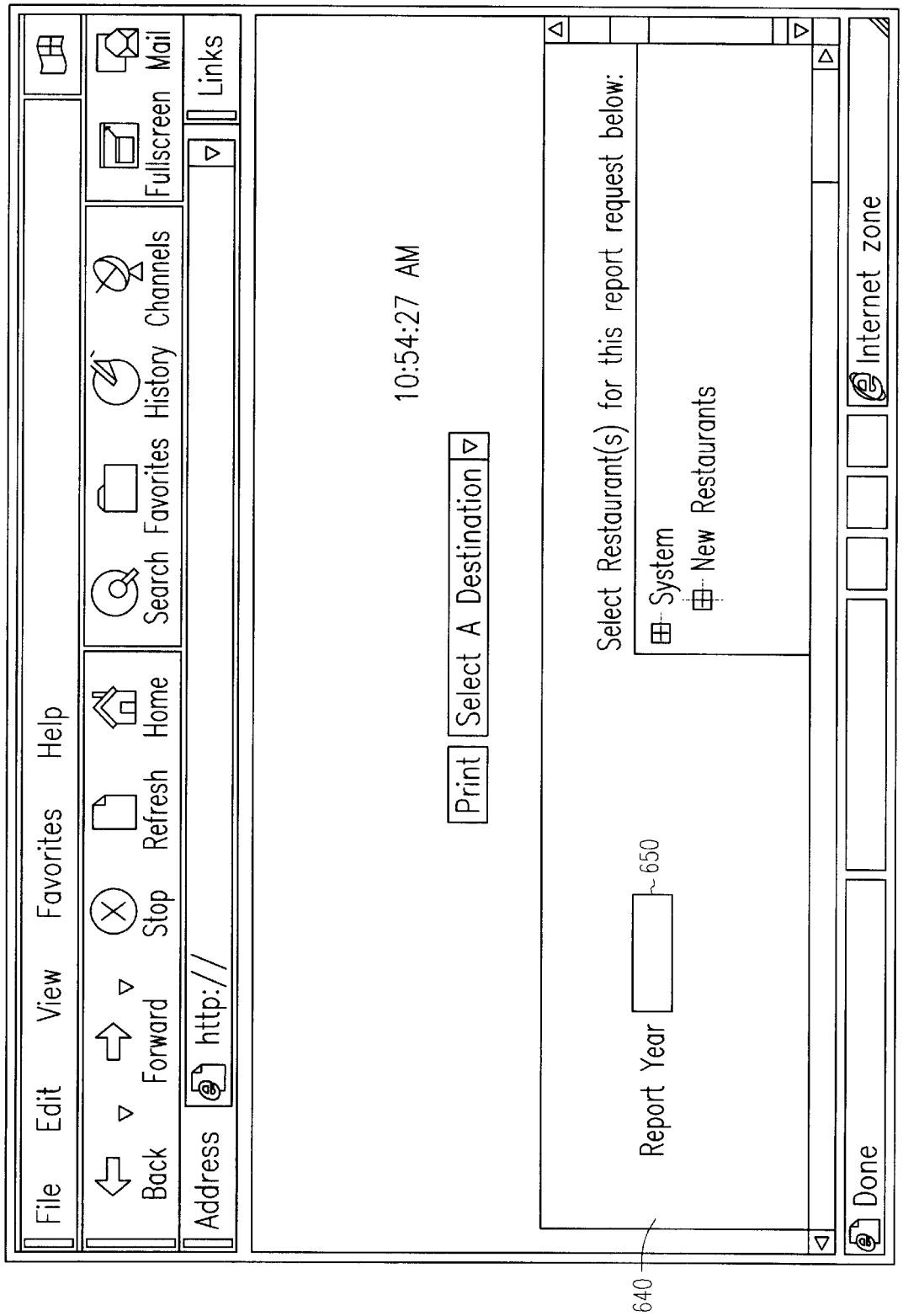
FIG. 19 shows a Planned Sales Report request screen, according to an embodiment of the invention.
Figure 20:
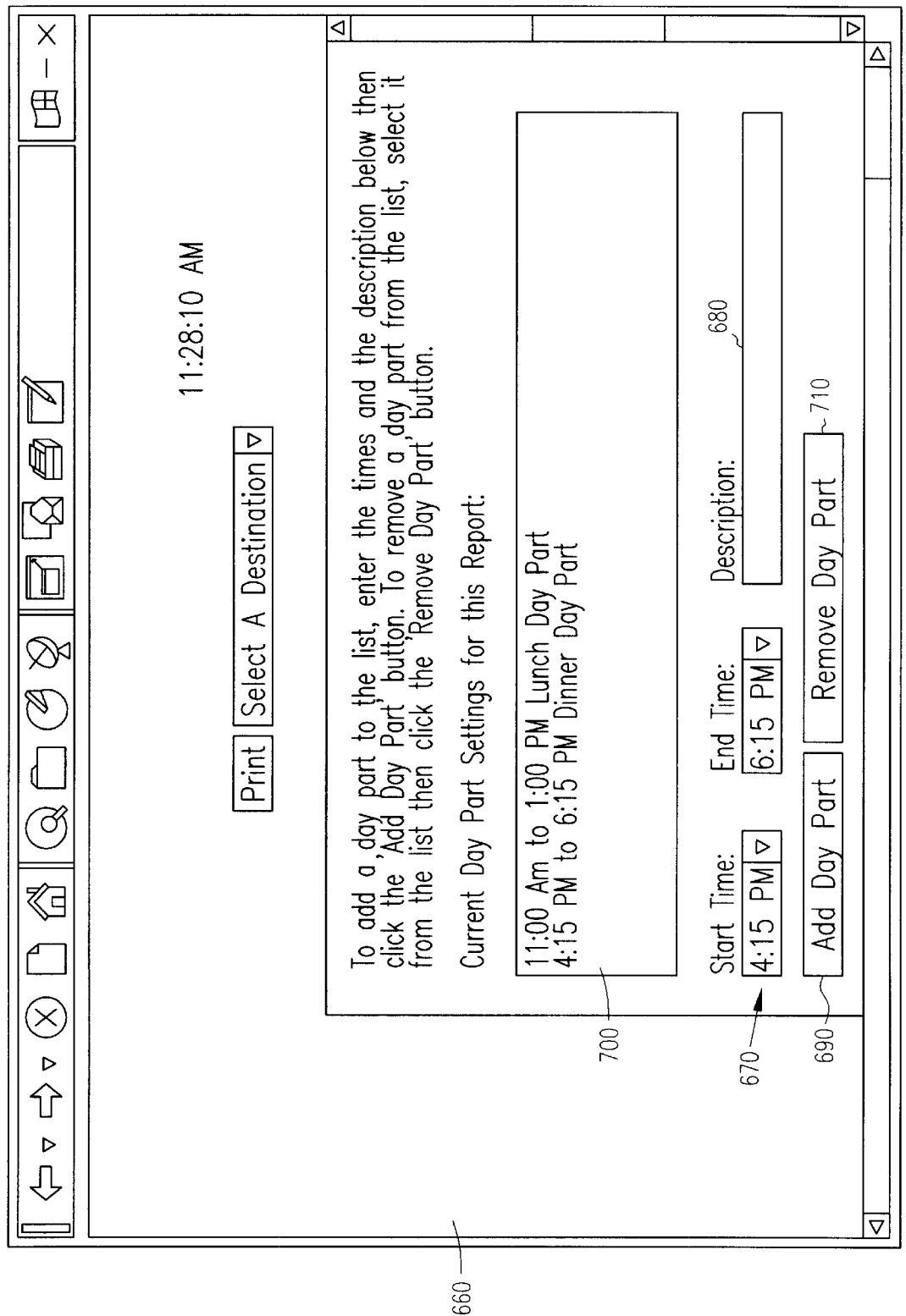
FIG. 20 shows a Day Part Mix Report request screen, according to an embodiment of the invention.

FIG. 19 shows Planned Sales Report request screen 640, which includes report year box 650 for entry of the desired year for the report. FIG. 20 shows the lower portion of Day Part Mix Report request screen 660. The user selects start and end times in boxes 670 and enters a description for the day part in box 680. When Add Day Part button 690 is clicked, the times and description appear in Current Day Part Settings box 700. To remove a day part from box 700, the appropriate line item in box 700 is highlighted, and Remove Day Part button 710 clicked.

For some business, an official business day begins at 6:00 a.m. on one day and ends at 5:59 a.m. on the next day. If the user tries to set up a day part that begins before 6:00 a.m. and ends after 6:00 a.m., an error message is generated, according to one embodiment, telling the user that the end time is before the start time. Suitable error messages can be generated or other indications provided for official business days having other start and end times, of course.

Figure 21:
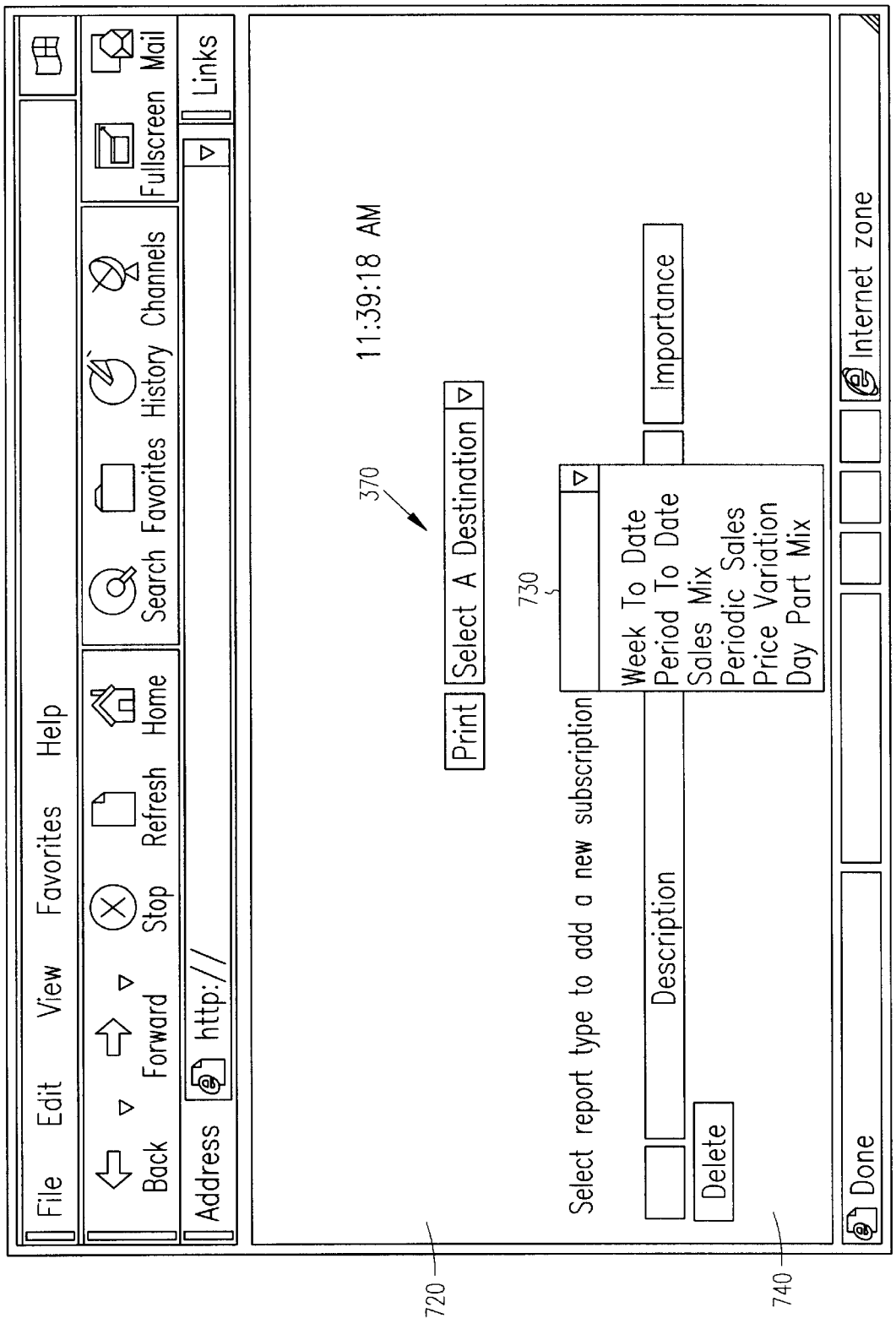
FIG. 21 shows a subscription request screen, according to an embodiment of the invention.
Figure 24:
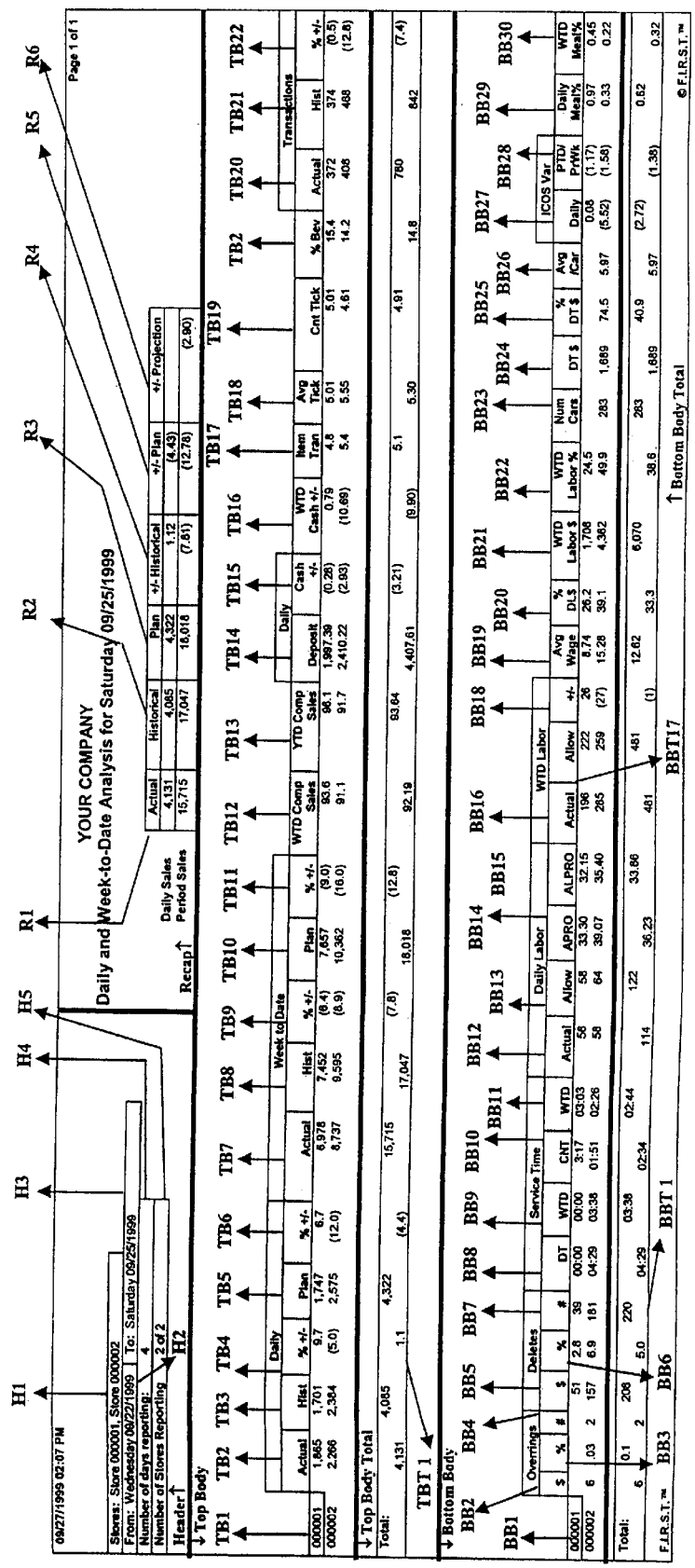
FIG. 24 shows a Week-To-Date/Period-To-Date sample report, according to an embodiment of the invention.
Figure 25A:
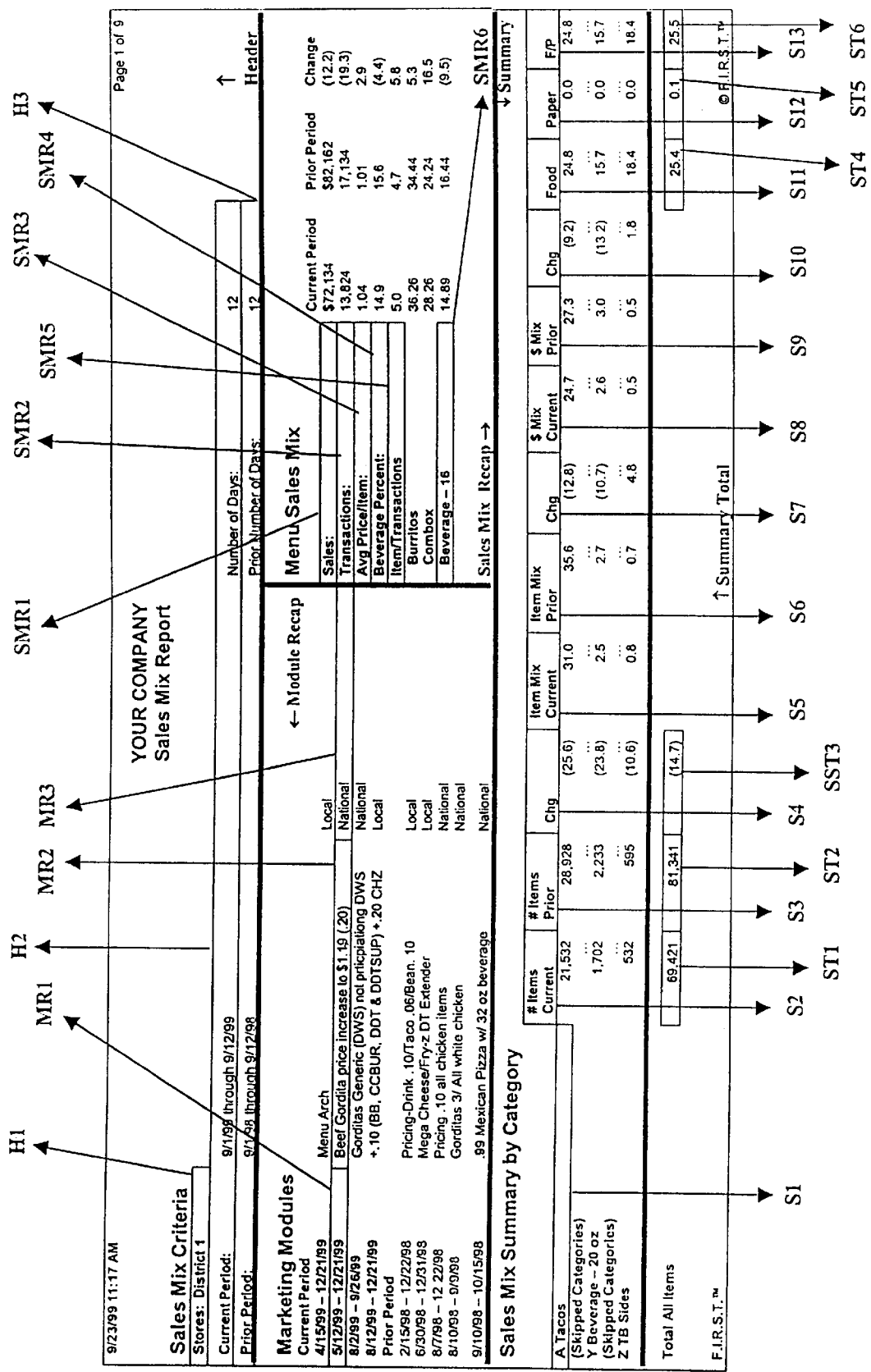
FIG. 25A shows a first portion of a Sales Mix sample report, according to an embodiment of the invention.
Figure 26:
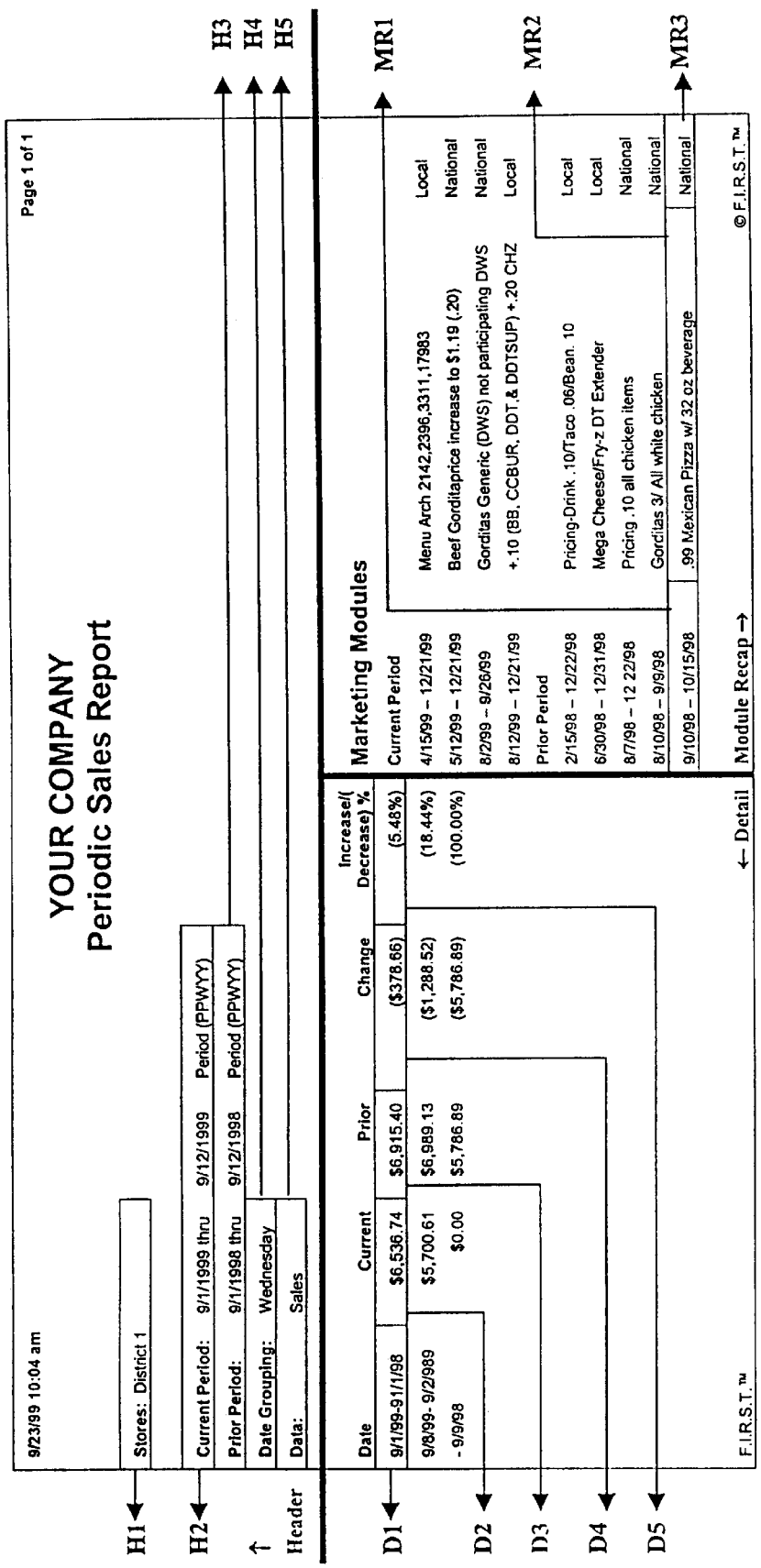
FIG. 26 shows a Periodic Sales Sample report, according to an embodiment of the invention.
Figure 29:
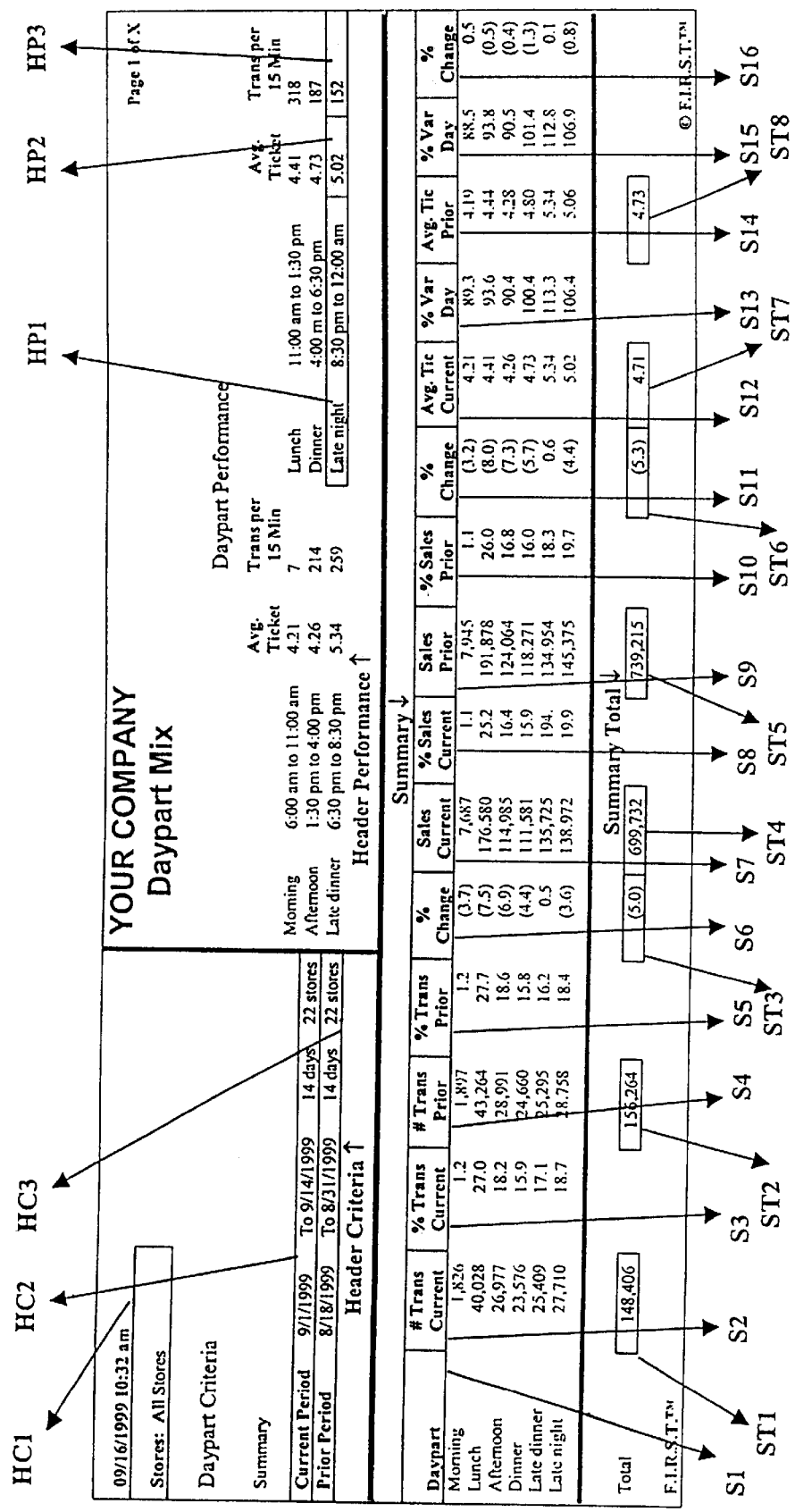
FIG. 29 shows a Day Part Mix sample report, according to an embodiment of the invention.

Returning momentarily to FIG. 4, a user can proceed from requested reports screen 210 to subscription request screen 720, using the "Report Subscriptions" item in drop-down list 370 (FIG. 7), for example. One specific subscription request screen 720 is shown in FIG. 21.

Subscriptions are requests for reports that recur. For instance, if a user wishes to see a Period To Date report at the end of each week, the user can create a subscription that automatically forwards the report to the user, by web delivery, e-mail or other mode, every week.

Report type selection drop-down list 730 enables the user to begin the process of setting up a subscription by selecting a report type. The reports appearing in list 730 can be the same as those appearing in list 370 on requested reports screen 210, for example, or can be a subset of those reports and/or include additional reports. Subscription detail area 740 is similar to detail area 220 of requested reports screen 210 (FIG. 6) and will not be described again in detail. The user may wish to include the word "subscription" in the description, so that it can easily be determined, when the report is delivered, that it came from a subscription. To update the contents of screen 720, the "Report Subscriptions" item from drop-down list 370 can be selected, or the browser refresh icon clicked. Other features of screen 720 are similar to those described with respect to previous screens and will not be repeated, to simplify the description.

Once a report type is selected from drop-down list 730, a respective new subscription screen 750 appears, as indicated in FIG. 4. One portion of screen 750 asks the user to enter the relevant data for the specific report, in a manner already described. In addition, each subscription screen 750 includes end date and begin date boxes 760, 770, as shown in FIG. 22. Depending on the number of periods that the user is asked to specify for a specific report, multiple boxes 760, 770 will appear. FIG. 22 represents a Day Part Mix Report subscription request. Because both current periods and prior periods are required to be entered, each period has its own end date box 760 and begin date box 770, as shown.

Figure 23:
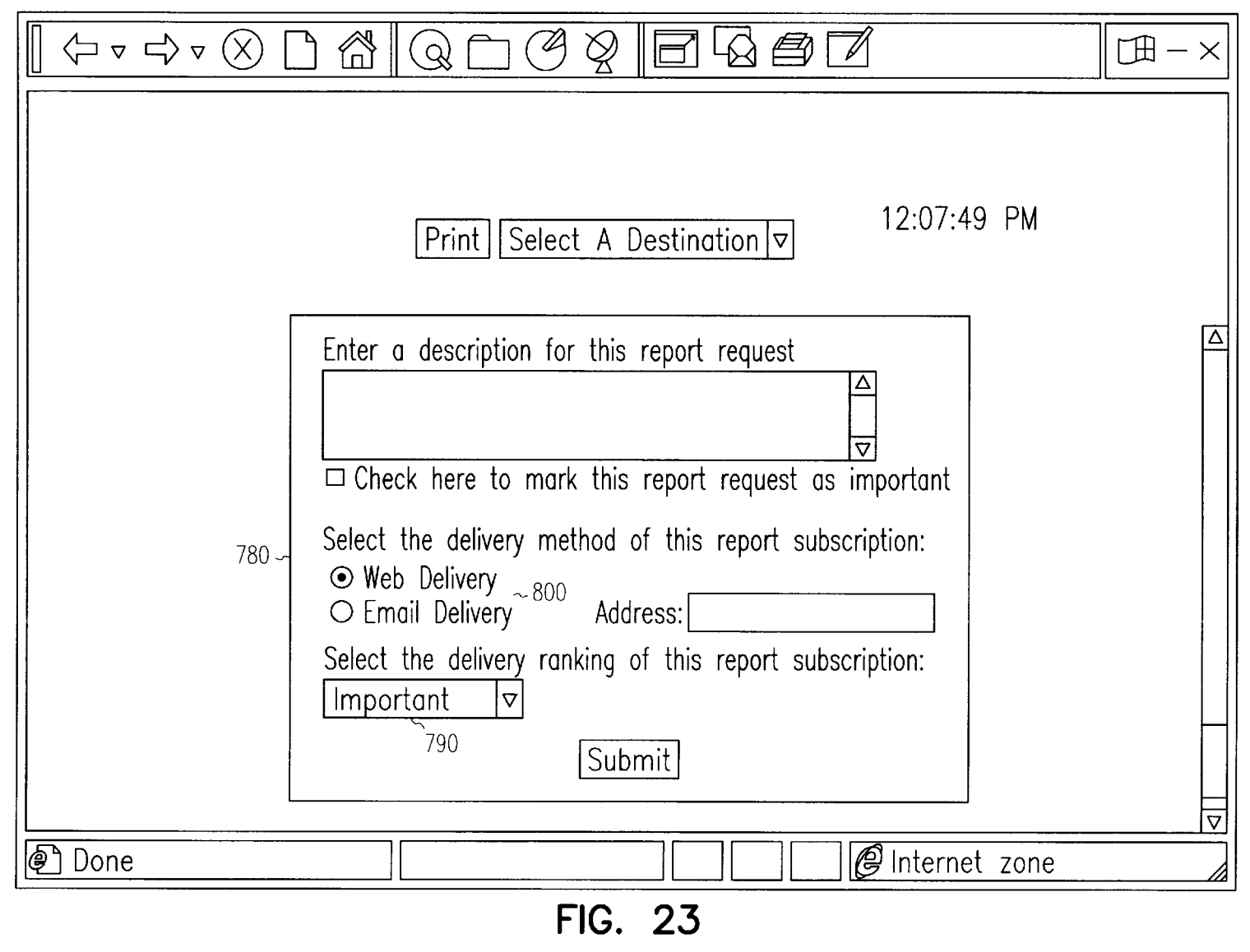

FIG. 23 shows selection box 780, which appears below the report set up boxes described earlier and below the boxes of FIG. 22, according to one embodiment. Many features of FIG. 23 are similar to those of FIG. 9, except that they apply to report subscriptions instead of reports themselves. These features will not be repeated, to simplify the disclosure.

Delivery ranking list 790 is used by the system to determine what priority to give to the processing of subscriptions. Each day, the system processes the subscriptions that are due that day. A subscription with a higher importance ranking will be processed before one having a lower ranking. Rankings can include, in order, critical, very important, important, medium, and low, for example. If web delivery is chosen at 800, the requested subscribed report will appear on the requested reports screen. If e-mail delivery is requested at 800, the report will not appear on the requested reports screen but will instead be forwarded to the designated e-mail address.

Setting Report Dates in Subscriptions

Embodiments of the invention are flexible enough to allow a user to ask for any report, including any subscribed report, to cover any period of time. To accomplish this flexibility, embodiments of the invention determine a subscriptions date range in a relative, versus absolute, way.

Relative Versus Absolute Dates: Date ranges to be specified in subscriptions are relative. Because subscriptions are designed to be repeating in nature, if the user were to set an absolute begin date or end date, the report would not recur. For example, if a report is set up to show data from Tuesday, September 14 to Monday, September 20 (absolute report dates), that subscription would only run once, as those dates occur only once in a given year.

Setting report dates in relative terms, however, allows the report to run every time the specified relationship between dates exists. Therefore, according to embodiments of the invention, a user picks an end date and defines its relationship to the beginning date as a date that is "one week earlier," for example. In this case, the subscription can and will run a report every day. This is because the relationship between the end date and the beginning date exists every day. For any date selected as an end date, there is always a date that is one week earlier.

Depending on the specific report for which a subscription is set up, more than one date may be requested. The Price Variation report, for example, asks for a beginning and end date. The Week To Date report, on the other hand, asks only for a report date. The Sales Mix report and Day Part Mix report described earlier ask for four dates—current begin date, current end date, prior begin date, and prior end date.

According to one embodiment, all reports are based on the most current daily extract file. According to one embodiment, the most current daily extract file represents the day before the current date. Therefore, on Tuesday, September 21, the daily extract file is for business on September 20. Therefore, whenever a subscription is created, the "extract date" is always yesterday.

Report dates build on each other, beginning with the most current date and extending backwards. Therefore, a subscription always begins by setting the end date. If there is more than one report date in a subscription, subsequent report dates will always be set in relation to the end date.

Because the user sets the end date first, the box (e.g. box 760 in FIG. 22) for the end date is preferably shown first, i.e. above the corresponding begin date box (770). The end date is set in relation to the date of the most recent daily extract, which is always yesterday. Once the end date is determined, the begin date is set in relationship to it.

The following tables provide examples of date ranges that can be set, and how they would be set using boxes 760, 770 according to the invention. The first table shows calendar dates and the second table shows the same examples using accounting dates.

Examples of calendar dates (Month/Day/Year)

| | End Date | | | | | Begin Date | | Result |
|---|---|---|---|---|---|---|---|---|
| | Current | | | | | | | |
| Current Date | Extract Date | Variable | Go Back | Resulting End Date | Variable | Go Back | Begin Date | Date Range |
| 9/1/99 | 8/31/99 | Day | 2 days | 8/29/99 | Period Begin Date (8/4/99) | 2 Periods | 7/9/99 | 7/9/99 to 8/29/99 |
| 8/25/99 | 8/24/99 | Week Begin Date (8/18/99) | 5 weeks | 7/14/99 | Date (7/14/99) | 3 weeks | 6/23/99 | 6/23/99 to 7/14/99 |

Examples using equivalent accounting dates (Day/Week/Period/Year)

| | End Date | | | | | Begin Date | | Result |
|---|---|---|---|---|---|---|---|---|
| | Current | | | | | | | |
| Current Date | Extract Date | Variable | Go Back | Resulting End Date | Variable | Go Back | Begin Date | Date Range |
| 1/1/10/99 | 7/4/9/99 | Day | 2 days | 5/4/9/99 | Period Begin Date (1/1/9/99) | 2 periods | 1/1/7/99 | 1/1/7/99 to 5/4/9/99 |
| 1/4/9/99 | 7/3/9/99 | Week Begin Date (1/3/9/99) | 5 weeks | 1/2/8/99 | Date (1/2/8/99) | 3 weeks | 1/3/7/99 | 1/3/7/99 to 1/2/8/99 |

Report Information

Illustrated embodiments of the invention include nine separate reports, the theory of each of which will now be described. As described previously, reports may be customized to look at any combination of stores, from one store to all stores, for any date range. Each report preferably shows the date and time it was requested, and the number of pages in the report, also in the manner previously described. Sample reports are shown in FIGS. 24–30.

1. Week To Date Report—FIG. 24
   Report Theory: The Week To Date report shows the performance of a selected store(s) and/or group(s) for over 40 different metrics of the business for the current day, as well as for the current week and the same week in the previous year.
   Using This Report: Because it contains all the pertinent information about a business, it can serve as a starting place for all management discussions, yet each user can focus on different information based on their interest. For instance, a franchisee might be most interested in the WTD and YTD sales figures, while a manager might focus on overrings and a restaurant general manager may look at labor figures.

2. Period To Date Report—FIG. 24
   Report Theory: The Period To Date report is identical to the Week To Date report except gives daily and period to date information.
   Using This Report. Use it as you would the Week To Date report.

3. Sales Mix Report—FIGS. 25A and 25B
   Report Theory: The Sales Mix report shows what products were sold by unit and by dollar value.
   Using This Report:
      The report can help a user understand how selected store(s) are doing relative to company goals.
      It can help the user decide to raise or lower prices. When prices are changed, the user can quickly see the impact of those changes on the number of units sold.
      The user can see if marketing modules are successful. It can aid in deciding whether to vary from suggested prices for future marketing modules.

4. Periodic Sales Report—FIG. 26
   Report Theory: The Periodic Sales Report allows the user to look at two periods of time and compare performance on the following business metrics: including sales, deposit, cash +/−, items per transaction, average ticket, counter ticket, percent beverage, transactions, overring dollars, overring percent, number of overrings, delete dollars, delete percent, number of deletes, drive through time, counter time, number of cars, drive through dollars, drive through dollars percent, average per car, or ICOS variance.
   Using This Report: This report can help the user focus attention on one business metric by looking at current and prior activity for a date or range of dates. It can also help determine trend.

5. Price Variation Report—FIG. 27
   Report Theory: The Price Variation Report compares the menu item prices charged at the POS against an authorized price list. This report is useful in determining where stores may not have made required price updates or where errors were made in those updates or in the system. Only menu items where there is some reported price variance will show on this report.

Using This Report: District managers and store managers will find this report helpful in determining that price updates are occurring on a timely and accurate basis.

6. Planned Sales Report—FIG. 28

Report Theory: The Planned Sales report shows the plan numbers that are contained in the system.

Using This Report: This report lists the data entered in the system for planned sales, figures which are used in many calculations in other reports. If a store undergoes a remodel or if other planned or unplanned interruptions (or upswings) occur in business, this report can be used to see the current planned sales and begin the process of determining if these figures need to be changed.

7. Day Part Mix Report—FIG. 29

Report Theory: Day Part Sales Mix shows e.g. sales, transactions, and average checks by time periods as small as e.g. 15 minutes. A day part can include as few as one 15-minute or smaller increment so that sales activity can be tracked very closely. The day parts are set up by the user at the time the report is requested and can be changed at as often as necessary.

Using This Report:

Some national marketing modules are aimed at boosting sales during a certain time period. This report can help a franchisee see if the modules are actually meeting the stated goals.

It can help the user decide whether to change a store's hours of operation or how to change staffing patterns.

8. Menu Item Report—FIG. 30

Report Theory: Like the Planned Sales report, the Menu Item Report lists the product costs and profit margins that are contained in the system. It should be updated periodically.

Using This Report. This report shows you the relationship between the cost, price, and profit of each product the operation sells.

9. Ranking Report

There are actually three different ranking reports. The only difference between them is the variable they rank by—drive through speed of service, counter speed of service, and productivity, for example. Because the reports are identical except for this variable, the information description given below applies for all three reports.

Report Theory. This report ranks stores on a variety of variables, for instance drive through or counter speed of service or productivity, showing the rankings for the day and for the WTD/PTD/CustomToDate. It also imbeds the company average to enable the user to see which stores are above and below the company average. In addition, if the user picks a subset of all stores, those stores will be ranked in a separate section of the report.

Using This Report: This report can be used to motivate district and store managers, for example.

Report Data Definitions

Week To Date/Period To Date Report Data Definition (Note: Because the Week To Date and Period To Date reports are identical except for the period they cover, the data definitions are given only once.)

This report includes six sections—the heading, the recap, top body, top total, bottom body, bottom total. The heading information and recap information appear only on the first page of the document. All the data about one stores appears in two lines, one in the top body and one in the bottom body. The top and bottom totals appear on the last page of the report and total all the stores in the report.

Header Information

| | |
|---|---|
| H1 | Stores: The store(s) and/or group(s) of stores included in the report. |
| H2 | From: The beginning date of the date range analyzed. For WTD reports, it will always be the date of the Wednesday of the week being analyzed. For PTD reports, it will always be the first day of the period being analyzed, which will also be a Wednesday. |
| H3 | To: The date of the last daily extract (which will always be yesterday). For WTD reports, it will always be no later than the Tuesday of the week being analyzed. For PTD reports, it will always be no later than the last day of the period being analyzed. |
| H4 | Number of days reporting: The number of days in the date range. For WTD reports, the number will range from 1 to 7. For PTD reports, the number will range from 1 to 28. |
| H5 | Number of stores reporting: The number of stores summarized on the report out of the number of stores requested by the user. These two number will usually be the same unless the Comparable box was checked when the report was requested. |

Recap Information: Where appropriate, a figure is shown for both the day and the week/period.

| | |
|---|---|
| R1 | Actual Sales: The total of the daily sales for the date shown in H3 and Weekly/Period Sales for all the dates in the date range (from H2 to H3) for all stores shown in H1. |
| R2 | Historical Sales: The total of the daily sales and weekly/period sales for the same business day and week/period in the previous year for all stores shown in H1. |
| | Plan: The average of the planned daily and weekly/period sales for all stores shown in H1. |
| R4 | +/− Historical: The percentage of difference between the Actual (R1) and Historical (R2) sales. |
| R5 | +/− Plan: The percentage of difference between Actual (R1) and Planned (R3) sales. |
| R6 | +#- Projection: The percentage of difference between the actual and project plan sales for the day and week/period, based on the performance of the stores shown in H1 in the report to date (i.e., how far above or below projected plan the stores will be at the current rate of sales). |

Top Body Information

| | |
|---|---|
| TB1 | Store Number: Number of the store about which information in the subsequent columns is reported. |
| TB2 | Daily - Actual: Actual sales for the day of the report (H3). |
| TB3 | Daily - Hist: Actual sales for the same accounting date in the previous year. |
| TB4 | Daily - % +/−: The percentage of difference between Actual (TB2) and Historical (TB3) sales. |

-continued

| | |
|---|---|
| TB5 | Daily - Plan: The planned sales for the day of the report (H3). |
| TB6 | Daily - % +/−: The percentage of difference between Actual (TB2) and Planned (TB5) sales. |
| TB7 | WTD/PTD - Actual: Actual sales to date for the current week/period of the report. |
| TB8 | WTD/PTD - History: Actual sales for the same accounting date range in the previous year. |
| TB9 | WTD/PTD - % +/−: The percentage of difference between WTD/PTD Actual (TB7) and WTD/PTD Historical (TB8) sales. |
| TB10 | WTD/PTD - Plan: The planned sales for the week/period of the report. |
| TB11 | WTD/PTD - % +/−: The percentage of difference between WTD/PTD Actual (TB7) and WTD/PTD Planned (TB10) sales. |
| TB12 | WTD/PTD Comp Sales: The percentage of difference between WTD/PTD Actual sales and sales for the same accounting period in the previous year. |
| TB13 | YTD Comp Sales: The percentage of difference between year to date sales and year to date sales for the previous year. |
| TB14 | Daily - Deposit: The actual cash deposit for the day of the report shown in H3. |
| TB15 | Daily - Cash +/−: The difference between the actual cash deposit (TB14) and the cash deposit the POS system reported for the day shown in H3. |
| TB16 | WTD/PTD Cash +/−: The difference between the actual cash deposit (TB14) and the cash deposit the POS system reported for the period of the report shown in H2 & H3. |
| TB17 | Item Tran: The number of items per transaction for the day of the report shown in H3. |
| TB18 | Avg Tick: The average price per transaction for the day of the report shown in H3. |
| TB19 | Cnt Tick: The average price per transaction for counter transactions for the day of the report shown in H3. |
| TB20 | % Beverage: The percentage of actual sales (TB2) represented by beverages. |
| TB21 | Transactions - Actual: The number of transactions for the day of the report shown in H3. |
| TB22 | Transactions - Hist: The number of transactions for the same accounting date in the previous year. |
| TB23 | Transactions - +/−%: The percentage of difference between Actual (TB21) and Historical (TB22) number of transactions. |

Top Body Total Information

| | |
|---|---|
| TBT1 | Totals: The totals or weighted averages for all columns shown in the Top Body. |

Bottom Body Information

| | |
|---|---|
| BB1 | Store Number: The number of the store about which information in the subsequent columns is reported. |
| BB2 | Overrings - $: The dollar value of overrings for the day of the report shown in H3. |
| BB3 | Overrings - %: The percentage of Actual sales (TB2) represented by the Dollar Value of overrings (BB2). |
| BB4 | Overrings - #: The number of overrings for the day of the report shown in H3. |
| BB5 | Deletes - #: The dollar value of deleted transactions for the day of the report shown in H3. |
| BB6 | Deletes - %: The percentage of Actual sales (TB2) represented by the Dollar Value of deletes (BB5). |
| BB7 | Deletes - #: Number of deleted transactions for the day of the report shown in H3. |
| BB8 | Service Time - DT: The average time of transaction at the drive-through window as measured by the POS system (not drive-through timer) for the day shown in H3. |
| BB9 | Service Time - WTD/PTD: The average time of transaction at the drive-through window for the WTD/PTD as measured by the POS system (not drive-through timer). |
| BB10 | Service Time - CNT: The average time of transaction at the counter as measured by the POS system for the day shown in H3. |
| BB11 | Service Time - WTD/PTD: The average time of transaction at the counter for the WTD/PTD. |
| BB12 | Daily Labor - Actual: The actual number of labors hours for the day of the report shown in H3. |
| BB13 | Daily Labor - Allowed: Allowed number of labor hours for the day of the report shown in H3. |
| BB14 | Daily Labor - Actual Productivity: The sales per actual labor hour (BB12) for the day shown in H3. |
| BB15 | Daily Labor - Allowed Productivity: The sales per allowed labor hour (BB13) for the day shown in H3. |
| BB16 | WTD/PTD Labor - Actual: The actual number of labors hours for the WTD/PTD. |
| BB17 | WTD/PTD Labor - Allowed: The allowed number of labor hours for the WTD/PTD. |
| BB18 | WTD/PTD Labor - +/−: The difference between the WTD/PTD Actual Labor (BB16) and Allowed Labor (BB17). |
| BB19 | Average Wage: The average wage paid to employees of the store shown in BB1. |
| BB20 | % DL $: The percentage of actual sales (TB2) represented by daily labor costs for the day shown in H3. |
| BB21 | WTD/PTD Labor $: The dollar value of labor for the WTD/PTD. |
| BB22 | WTD Labor %: The percentage of WTD/PTD Actual sales (TB7) represented by WTD/PTD Labor (BB22). |
| BB23 | Number of Cars: The number of cars through the drive-through window for the day of the report shown in H3 measured by the POS system. |
| BB24 | Drive-Through $: The number of drive-through transactions for the day shown in H3. |
| BB25 | Drive-Through %: The percentage of Actual sales (TB2) represented by the dollar value of drive through transactions (BB25). |
| BB26 | Average Per Car: The average ticket per car for the day shown in H3. |
| BB27 | ICOS Variance - Daily: |
| BB28 | ICOS Variance - PTD/PrWk: |
| BB29 | Daily Meal %: The percentage of Actual sales (TB2) that represented employee/promo meals for the day shown in H3. |
| BB30 | PTD/WTD Meal %: The percentage of WTD/PTD sales (TB7) that represented employee/promo meals for the WTD/PTD. |

Bottom Body Total Information

| | |
|---|---|
| BBT1 | Totals: The totals or weighted averages for all columns shown in the Bottom Body. |

Sales Mix Data Definition

This report includes seven sections—header, module recap, sales mix recap, summary, summary total, detail, and detail total. The Detail and Detail Total sections of this report are not shown in this data definition. The data definitions are identical in content to the Summary and Summary Total sections, except that a detail and detail total is displayed for each category, showing information in subsequent columns for each item in the category.

Header Information

| | |
|---|---|
| H1 | Stores: The stores included in the report, shown by group name and/or store number. |
| H2 | Current Period: The beginning and end dates of the current period analyzed, including the number of days in the period. |
| H3 | Prior Period: The beginning and end dates of the prior period analyzed, including the number of days in the period. |

Module Recap Information

| | |
|---|---|
| MR1 | Date: The active date range for the module described in MR2. |
| MR2 | Description: The description of the module. |
| MR3 | Origin: The origin of the module-either national or local. |

Sales Mix Recap Information

| | |
|---|---|
| SMR1 | Sales: Total dollar value of sales for the current and prior periods and the percentage of change between the two periods. |
| SMR2 | Transactions: Total number of transactions for the current and prior periods and the percentage of change between the two periods. |
| SMR3 | Avg Price/Item: The average price per item for the current and prior periods and the percentage of change between the two periods. |
| SMR4 | Avg Ticket: The average ticket for the current and prior periods and the percentage of change between the two periods. |
| SMR5 | Beverage Percent: The percent of sales that represent beverages in the current and prior periods and the percentage of change between the two periods. |
| SMR6 | Item/Transactions: The average number of items per transaction for the current and prior periods and the percentage of change between the two periods. |
| SMR7 | Incidences: For selected menu items, the number of transactions per 100 transactions for the current and prior periods and the percentage of change between the two periods. |

Summary Information

| | |
|---|---|
| S1 | Category: The menu item category for which summary information appears in subsequent columns. |
| S2 | # Items Current: The number of items in the category shown in S1 that were sold in the current period. |
| S3 | # Items Prior: The number of items in the category shown in S1 that were sold in the prior period. |
| S4 | Change: The percentage of difference between the number of items sold in the current (S2) and prior (S3) periods. |
| S5 | Item Mix Current: The percentage of total number of items sold in the category shown in S1 that were sold in the current period. |
| S6 | Item Mix Prior: The percentage of total number of items sold in the category shown in S1 that were sold in the prior period. |
| S7 | Change: The percentage of difference between the item mix in the current (S5) and prior (S6) periods. |
| S8 | $ Mix Current: The percentage of total sales represented by the category shown in S1 that were sold in the current period. |
| S9 | $ Mix Prior: The percentage of total sales represented by the category shown in S1 that were sold in the prior period. |
| S10 | Change: The percentage of difference between the dollar value of the category in the current (S5) and prior (S6) periods. |
| S11 | Food: The weighted food cost percentage for the category shown in S1. (To ensure an accurate percentage, the cost of all items in the category were summed and then divided by the total sales for the category.) |
| S12 | Paper: The weighted paper cost percentage for the category shown in S1. (To ensure an accurate percentage, the cost of all items in the category were summed and then divided by the total sales for the category.) |
| S13 | F/P: The weighted total food and paper cost percentage for the category shown in S1. (To ensure an accurate percentage, the cost of all items in the category were summed and then divided by the total sales for the category.) |

Summary Total Information

| | |
|---|---|
| ST1 | # Items Current: The total of all categories for S2. |
| ST2 | # Items Prior: The total of all categories for S3. |
| ST3 | Change: The percentage of difference between the total number of items sold in all categories in the current (ST1) and prior (ST2) periods. |
| ST4 | Food: The weighted food cost percentage for all categories. |
| ST5 | Paper: The weighted paper cost percentage for all categories. |
| ST6 | F/P: The weighted total food and paper cost percentage for all categories. |

Periodic Sales Data Definition

This report includes three sections—the header, detail, and module recap.

Header Information

| | |
|---|---|
| H1 | Stores: The stores included in the report, shown by group name and/or store number. |
| H2 | Current Period: The beginning and ending dates of the current period analyzed. |
| H3 | Prior Period: The beginning and ending dates of the prior period analyzed. |
| H4 | Date Grouping: The time period by which comparisons of the current and prior periods will be grouped in the Date column (D1). The user may choose any of the days of the week, week or period. |
| H5 | Data: The business metric for which data is shown. It could be one of several metrics, including sales, deposit, cash +/−, items per transaction, average ticket, counter ticket, percent beverage, transactions, overring dollars, overring percent, number of overrings, delete dollars, delete percent, number of deletes, drive through time, counter time, number of cars, drive through dollars, drive through dollars percent, average per car, or ICOS variance. |

Detail Information

| | |
|---|---|
| D1 | Date: The time period by which the comparisons in subsequent columns of the current and prior periods are broken down. The selected time period variable, set at the time the report is requested, is shown in H4. |
| D2 | Current: The total for the current period shown in H2 for the metric shown in H5. |
| D3 | Prior: The total for the prior period shown in H3 for the metric shown in H5. |
| D4 | Change: The difference between the current and prior period. |
| D5 | Increase/(Decrease) %: The percentage of increase or decrease of the current period over the prior period. |

Module Recap Information

| | |
|---|---|
| MR1 | Date: The active date range for the module described in MR2. |
| MR2 | Description: The description of the module. |
| MR3 | Origin: The origin of the module-either national or local. |

Price Variation Report Data Definition

This report includes two sections—the heading and the detail. The heading information appears only on the first page of the document. The detail is divided by menu item.

Header Information

| | |
|---|---|
| H1 | Stores: The stores included in the report, shown by group name and/or store number. |
| H2 | Date Range: The beginning and ending dates of the period analyzed, as well as the type of dates shown (calendar or accounting). |
| H3 | Overcharge: The total amount overcharged to customers. |
| H4 | Undercharge: The total amount undercharged to customers. |
| H5 | Net: The result of H3 minus H4. |

Detail Information

| | |
|---|---|
| D1 | Menu Item: The six-character code of the menu item. |
| D2 | Menu Item Name: The descriptive name of the menu item. |
| D3 | Price: The price shown in the system for the menu item; the price against which the actual price paid by the customer (taken from the daily extract file) is compared. |
| D4 | Over/(Under): The total dollar value of the transactions for this menu item that reported a variance. |
| D5 | Business Date: The date which one or more transactions for this menu item reported a variance. |
| D6 | Store: The store number and name reporting the variance. |
| D7 | Quantity Sold: Number of menu items sold at a variance for the business date given in D5. |
| D8 | Price: The price charged for the menu item. |
| D9 | Over/(Under): The total variance for the number of items shown in D7. |

Planned Sales Data Definition

This report includes three sections—the heading, the detail, and the totals. The heading information appears only on the first page of the document. The totals are only shown at the end of the detail, which may print on more than one page.

Header Information

| | |
|---|---|
| H1 | Year: The business year for which the planned sales numbers are shown. |
| H2 | Stores: The stores included in the report, shown by group name and/or store number. |

-continued

Detail Information

D1 Store Number: The store number for which plan numbers are given in subsequent columns.
D2 Menu Item Name: The planned sales number for the period shown in the column heading.
D3 Price: The total planned sales for the store shown in D1 for all 13 periods of the year shown in H1.

Total Information

D4 Period Total: The total planned sales for the period shown in the column heading.
D5 Year Total: The total of planned sales for all 13 periods of the year shown in H1.

Day Part Mix Report Data Definition

This report includes six sections—header criteria, header performance, summary, summary total, detail, and detail total. The Detail and Detail Total sections of this report are not shown in this data definition; the data definitions are identical in content to the Summary and Summary Total sections, except that they give data for one store.

Header Criteria

HC1 Stores: The stores included in the report, shown by group name and/or store number.
HC2 Current Period: The period for which the report is made, including the number of days in the period and the number of stores reported.
HC3 Prior Period: The period to which the current period is compared, including the number of days in the period and the number of stores reported.

Header Performance (NOTE: Performance data is only shown for the current period.)

HP1 Day Part: The day part defined by the user requesting the report, including the name and the time period.
HP2 Average Ticket: The average ticket price for the day part shown in HP1. (Also shown in S12.)
HP3 Transactions per 15 Minutes: The average transactions in the day part shown in HP1 divided by the number of 15-minute periods in the day part shown in HP1.

Summary

S1  Day Part: The day part for which data is reported in subsequent columns.
S2  # Trans Current: The number of transactions in the current period for the day part shown in S1.
S3  % Trans Current: The percentage of the total transactions for the current period that occurred in the day part shown in S1.
S4  # Trans Prior: The number of transactions in the prior period for the day part shown in S1.
S5  % Trans Prior: The percentage of the total transactions for the prior period that occurred in the day part shown in S1.
S6  % Change: The percentage of difference between the current period (S2) and prior period (S4) for the day part shown in S1.
S7  Sales Current: The dollar value of the transactions in the current period for the day part shown in S1.
S8  % Sales Current: The percentage of the total dollar value for the current period that occurred in the day part shown in S1.
S9  Sale Prior: The dollar value of the transactions in the prior period for the day part shown in S1.
S10 % Sales Prior: The percentage of the total dollar value for the prior period that occurred in the day part shown in S1.
S11 % Change: The percentage of difference between the current period (S7) and prior period (S9) for the day part shown in S1.
S12 Avg. Tic Current: The average ticket of all transactions in the current period for the day part shown in S1. (Also shown in HP2.)
S13 % Var Day: The percentage of difference between the average ticket in the current period (S12) for the day part shown in S1 and the average ticket for the average entire business day of the current period (not shown on this report).*
S14 Avg. Tic Prior: The average ticket of all transactions in the prior period for the day part shown in S1
S15 % Var Day: The percentage of difference between the average ticket in the prior period (S14) for the day part shown in S1 and the average ticket for the average entire business day of the prior period (not shown on this report).*
S16 % Change: The percentage of difference between the current period (S12) and prior period (S14) for the day part shown in S1.

*Numbers less than 100 denote that the average ticket for the day part was less than the average ticket for the entire day (i.e., 99.4% would mean that the day part average ticket is .6% less than the average ticket for that period). Numbers over 100 denote that the average ticket for the day part exceeded the average ticket for the entire period by the amount over 100 (i.e., 110.4% would mean that the day part average ticket is 10.4% higher than the average ticket for the period).

Summary Total

ST1  # Trans Current: The total of all S2 for all day parts on the report.
ST2  # Trans Prior: The total of all S4 for all day parts on the report.
ST3  % Change: The average for all S6 for all day parts on the report.
ST4  Sales Current: The total of all S7 for all day parts on the report.
ST5  Sale Prior: The total of all S9 for all day parts on the report.
ST6  % Change: The average for all S11 for all day parts on the report.
ST7  Avg. Tic Current: The average of all S12 for all day parts on the report.
ST8  Avg. Tic Prior: The average of all S114 for all day parts on the report.

Menu Item Data Definition

The Menu Item report includes two sections—the header and the detail.

Header Information

H1  Report Title: The type of report.
H2  Report Date: The date for which the menu item information is shown.

Detail Information

D1  Code: The six-digit code of the menu item taken from the POS system.
D2  Description: The longer description of the item represented by the code in D1.
D3  Food Cost: The total cost for all food used in preparing the item.
D4  Paper Cost: The total cost for all paper items (cups, straws, lids, wrappers, etc.) that are used in the sale of the item.
D5  Total Cost: The combined food and paper cost of an item.
D6  Price: The price charged for the item by the POS system.
D7  Cost %: The percentage of the price of the item (D6) which goes toward food and paper expenses (D5).
D8  Margin %: The percentage of the price of the item (D6) which remains after subtracting food and paper costs (D5).

Although the invention has been described with respect to specific embodiments, the description herein is intended to be illustrative of the many variations and alternatives contemplated by the invention. The invention contemplates reporting variables and functions other than the specific ones described herein, for example drive-through timer connectivity allowing acquisition of data from a restaurant's drive-through timer, for reporting and analysis purposes. Audio and video broadcasting and e-mail, and chat communication capabilities, are contemplated as well. Smart card integration enables customer recognition and personalizes a customer's experience. A guest can swipe his or her smart card and can be greeted by name, asked if he or she will have "the usual," told how much time has elapsed since the previous visit, etc. Integration with other databases is contemplated, for example those tracking customer complaints, mystery shopping reports, etc. Other contemplated reports include sales tax reports and per-store average sales reports. Transaction level detail analysis is also contemplated, to determine which items were bought within a specific transaction and to generate reports accordingly. A variety of programming languages can be used to effect the various described and contemplated embodiments, for example SQL Visual Basic or other languages. As point-of-sale systems change and as data becomes available from additional sources in computer form, embodiments of the invention will accept that data and include that information in its reports. Any one of these or previously described functionalities, of course, can be considered optional to the overall system.

In summary, embodiments of the invention allow management information from a variety of sources to be moved quickly from the collection point in the store to the corporate office, combined in a variety of formats that take advantage of the data's interconnectedness, and pushed quickly back out to managers and store personnel, for example, so that operations can be refined and improved at all levels. As a result, users at all levels of a variety of business organizations can make business decisions that are based on current information describing all parts of the operation, in a manner heretofore believed unknown in the prior art.

What is claimed is:

1. A method of generating custom reports based on restaurant point-of-sale data transferred between multiple remote computing devices and a central computing device, the method comprising:

(a) transferring point-of-sale data to a central computing device from multiple computing devices at multiple remote locations, wherein such locations comprise restaurants;

(b) a restaurant-industry user logging into a web site for the purpose of defining a custom report format using an Internet-browser interface, wherein such defining is initiated with web-based report generating selection operations starting from a report initiating page and concluding with a report request selection, wherein the selection operations include:

displaying on a page one or more report formats, wherein each displayed report format is presented at least in part with textual information indicative of the nature of the report format, wherein the page is configured to process a selection operation from the restaurant-industry user that specifies at least one of the report formats, and wherein the at least one report format accesses a selected portion of the point-of-sale data as defined in one or more queries used to populate the at least one report format;

displaying on a page one or more remote locations associated with the restaurant-industry user according to one or more user permissions that can be assigned by an administrator on a user-by-user basis, wherein each displayed remote location is presented at least in part with textual information indicative of the remote location, and wherein the page is configured to process a selection operation from the restaurant-industry user that specifies at least one of the remote locations;

displaying on a page one or more operative data-entry fields configured to process a selection operation from the restaurant-industry user that specifies one or more dates or date ranges, wherein the operative data-entry fields are substantially only those required to obtain the dates or date ranges associated with the at least one specified report format;

wherein the restaurant-industry user navigates between one or more of the selection operations using Internet-browser navigation mechanisms; and wherein access to and administration of the underlying point-of-sale data is controlled as a function of the report formats and remote locations made available for the user to choose in defining the custom report format so that the user obtains access only to a selected portion of the point-of-sale data;

(c) generating a custom report using the custom report format, the custom report being based on point-of-sale data related to the specified remote locations and the specified dates or date ranges; and (d) enabling the restaurant-industry user to view or obtain the generated custom report using the Internet.

2. The method of claim 1, wherein (b) includes communicating the custom report format over the Internet from the central computing device.

3. The method of claim 1, wherein (b) includes specifying a subset of the multiple remote locations on which to base the custom report.

4. The method of claim 1, wherein (b) includes displaying the operative data-entry fields configured to receive input from the restaurant-industry user that specifies a date range covering multiple days.

5. The method of claim 1, wherein (b) includes displaying the operative data-entry fields configured to receive input from the restaurant-industry user that specifies intraday time periods.

6. The method of claim 1, wherein (a) occurs automatically on a daily basis.

7. The method of claim 1, wherein (b) includes displaying the operative data-entry fields configured to receive input from the restaurant-industry user that specifics a current period and a prior period, and wherein (c) includes comparing point-of-sale data from the current period and the prior period.

8. The method of claim 7, wherein (c) includes excluding current-period point-of-sale data from the comparison if corresponding prior-period point-of-sale data is nonexistent.

9. The method of claim 1, wherein the method further comprises (e) storing point-of-sale data for each of the remote locations at a location associated with the central computing device.

10. The method of claim 1, wherein (c) includes combining point-of-sale data transferred in (a).

11. The method of claim 1, further comprising (e) creating a report subscription on a recurring subscription basis.

12. The method of claim 11, wherein (d) comprises enabling the restaurant-industry user to obtain an e-mail containing the generated custom report.

13. The method of claim 1, wherein (a) includes transferring point-of-sale data that is generated by one or more cash registers at each remote location.

14. The method of claim 1, wherein (b) includes specifying any combination of multiple remote locations on which to base the custom report.

15. The method of claim 1, wherein (b) occurs using a graphical user interface.

16. The method of claim 1, wherein (b) includes displaying the remote locations in a hierarchical format and presenting the hierarchical format to the user.

17. The method of claim 16, wherein (b) includes displaying the remote locations in a hierarchical format that divides the remote locations and/or remote computing devices into organizational units, and wherein each remote location and/or remote computing device appears in multiple organizational units.

18. The method of claim 1, wherein transferring point-of-sale data to a central computing device includes transferring point-of-sale data to at least one processor and at least one storage device.

19. The method of claim 1, wherein displaying the report formats, displaying the remote locations, and displaying the operative data-entry fields occurs on different pages.

* * * * *